US012792222B2

(12) United States Patent
Kamarthi et al.

(10) Patent No.: US 12,792,222 B2
(45) Date of Patent: Nov. 10, 2026

(54) HARD DISK DRIVE FAILURE PREDICTION METHOD

(71) Applicant: Northeastern University, Boston, MA (US)

(72) Inventors: Sagar Kamarthi, Franklin, MA (US); Wei Li, Boston, MA (US); Haozhou Zhou, Boston, MA (US); Srinivasan Radhakrishnan, Boston, MA (US)

(73) Assignee: Northeastern University, Boston, MA (US)

( * ) Notice: Subject to any disclaimer, the term of this patent is extended or adjusted under 35 U.S.C. 154(b) by 226 days.

(21) Appl. No.: 18/656,095

(22) Filed: May 6, 2024

(65) Prior Publication Data

US 2024/0370177 A1 Nov. 7, 2024

Related U.S. Application Data

(60) Provisional application No. 63/464,171, filed on May 4, 2023.

(51) Int. Cl.
*G06F 11/00* (2006.01)
*G06F 3/06* (2006.01)

(52) U.S. Cl.
CPC .......... *G06F 3/0616* (2013.01); *G06F 3/0653* (2013.01); *G06F 3/0676* (2013.01)

(58) Field of Classification Search
CPC ..... G06F 3/0616; G06F 3/0653; G06F 3/0676
See application file for complete search history.

(56) References Cited

U.S. PATENT DOCUMENTS

| | | | | |
|---|---|---|---|---|
| 10,216,558 | B1 | 2/2019 | Gaber et al. | |
| 10,459,814 | B2 | 10/2019 | Gao et al. | |
| 2002/0133312 | A1* | 9/2002 | Peterson | G11C 11/56 702/181 |
| 2009/0161243 | A1* | 6/2009 | Sharma | G11B 27/36 |

(Continued)

OTHER PUBLICATIONS

Murray et al., "Machine Learning Methods for Predicting Failures in Hard Drives: A Multiple-Instance Application", Journal of Machine Learning Research 6 (2005), pp. 783-816.

(Continued)

*Primary Examiner* — Amine Riad
(74) *Attorney, Agent, or Firm* — Adams & Reese LLP

(57) ABSTRACT

Provided herein are methods and systems for a hard drive failure prediction system to determine a predicted hard drive failure within a time-in-advance determined time period. The system includes a machine-learning model, such as an XGBoost model, trained using historical hard drive operational data from a data center. The historical hard drive operation data corresponds to SMART attributes. Statistical analysis is performed to determine a set of SMART attributes most indicative of hard drive failure. The model is trained using the historical hard drive operational data corresponding to the set of SMART attributes. The accuracy results of the model are used to determine a time-in-advance value that balances accuracy with failure lead time. A signal length of operational data for a particular hard drive is provided as input to the trained model and an output indicates if the hard drive will fail within the time period of the time-in-advance value.

21 Claims, 17 Drawing Sheets

(56) References Cited

U.S. PATENT DOCUMENTS

| | | | | |
|---|---|---|---|---|
| 2017/0017557 | A1* | 1/2017 | Oshima | G06F 11/008 |
| 2021/0042590 | A1* | 2/2021 | Watts | G06N 5/045 |
| 2021/0264294 | A1* | 8/2021 | Zheng | G06F 11/16 |
| 2022/0050918 | A1* | 2/2022 | Macedo | G06F 18/2148 |
| 2023/0136274 | A1* | 5/2023 | Bruno | H04L 49/205 711/154 |
| 2024/0037368 | A1* | 2/2024 | Arora | G06N 3/04 |
| 2024/0160511 | A1* | 5/2024 | Hao | G06F 11/0751 |
| 2024/0362097 | A1* | 10/2024 | Paulraj | G06F 11/004 |
| 2025/0028469 | A1* | 1/2025 | Kulshrestha | G06F 11/3034 |

OTHER PUBLICATIONS

Hughes et al., "Improved Disk Drive Failure Warnings", IEEE Transactions on Reliability 51.3 (Sep. 2002). Conference Name: IEEE Transactions on Reliability, pp. 1-10.

Murray et al., "Hard drive failure prediction using non-parametric statistical methods", Researchgate.net Publication 228972414, (Jan. 2003), 5 pages.

Shen et al., "Random-forest-based failure prediction for hard disk drives", International Journal of Distributed Sensor Networks 14.11 (Nov. 2018), pp. 1-15.

Anantharaman et al., "Large Scale Predictive Analytics for Hard Disk Remaining Useful Life Estimation", Conference: (2018) IEEE International Congress on Big Data (BigData Congress), 4 pages.

Hu et al., "Prognostics and Health Management: A Review from the Perspectives of Design, Development and Decision", Reliability Engineering & System Safety (2021), pp. 1-30.

Anonymous, Wayback Machine, Seagate Technology Paper (1999), url: : //web.archive.org/web/20010612122823/ http://www.seagate.com/newsinfo/docs/disc/enhanced_smart.pdf (visited on Sep. 8, 2025), 5 pages.

Xu et al. "Health Status Assessment and Failure Prediction for Hard Drives with Recurrent Neural Networks", IEEE Transactions on Computers vol. 65, No. 11 (Nov. 2016). Conference Name: IEEE Transactions on Computers, pp. 3502-3508.

Pang et al., "A combined Bayesian network method for predicting drive failure times from SMART attributes", 2016 International Joint Conference on Neural Networks (IJCNN). (2016) International Joint Conference on Neural Networks (IJCNN), pp. 4850-4856.

Han et al., "StreamDFP: A General Stream Mining Framework for Adaptive Disk Failure Prediction", IEEE Transactions on Computers 72.2 (Feb. 2023). Conference Name: IEEE Transactions on Computers, 14 pages.

Xu et al., "Improving Service Availability of Cloud Systems by Predicting Disk Error", USENIX Annual Technical Conference, (2018), pp. 481-493.

Anonymous, Backblaze Hard Drive Stats, url: //www.backblaze.com/b2/hard-drive-test-data.html (visited on Sep. 8, 2025), 10 pages.

Ma et al., "RAIDShield: Characterizing, Monitoring, and Proactively Protecting Against Disk Failures", 13th USENIX Conference on File and Storage Technologies (FAST '15) (2015), pp. 241-256.

Zhu et al., "Proactive Drive Failure Prediction for Large Scale Storage Systems", Mass Storage Systems and Technologies (MSST), (2013) IEEE 29th Symposium on, 5 pages.

Huang et al., "Characterizing Disk Failures with Quantified Disk Degradation Signatures: An Early Experience", (2015) IEEE International Symposium on Workload Characterization, 10 pages.

Li et al., "New Metrics for Disk Failure Prediction That Go Beyond Prediction Accuracy", IEEE Access 6 (2018). Conference Name: IEEE Access, pp. 76627-76639.

Hamerly et al., "Bayesian approaches to failure prediction for disk drives", Proceedings of the Eighteenth International Conference on Machine Learning. ICML '01. San Francisco, CA, USA: Morgan Kaufmann Publishers Inc, Jun. 28, 2001, 8 pages.

Zhao et al., "Predicting Disk Failures with HMM- and HSMM-Based Approaches", Lecture Notes in Computer Science. Berlin, Heidelberg: Springer, (2010), pp. 390-404.

Li et al., "Hard Drive Failure Prediction using Decision Trees", Reliability Engineering & System Safety (2017), pp. 55-65.

Li et al. "Hard Drive Failure Prediction Using Classification and Regression Trees", (2014) 44th Annual IEEE/IFIP International Conference on Dependable Systems and Networks (DSN), pp. 383-394.

Rincon et al., "Disk Failure Prediction in Heterogeneous Environments", 2017 International Symposium on Performance Evaluation of Computer and Telecommunication Systems (SPECTS). Jul. 2017, pp. 1-7.

Amram et al., "Interpretable predictive maintenance for hard drives", Machine Learning with Applications 5 (2021), 100042, 11 pages.

Lu et al., "Making Disk Failure Predictions SMARTer!", Proceedings of the 18th Usenix Conference on File and Storage Technologies. FAST'20. USA: USENIX Association, (2020), pp. 151-168.

Sun et al., "System-level hardware failure prediction using deep learning", Conference: the 56th Annual Design Automation Conference (2019), 7 pages.

Botezatu et al., "Predicting Disk Replacement towards Reliable Data Centers", 22nd ACM SIGKDD International Conference (2016), 10 pages.

Züfle et al., "To Fail Or Not To Fail: Predicting Hard Disk Drive Failure Time Windows", Published by Springer Nature (2020), pp. 1-18.

Mahdisoltani et al., "Improving Storage System Reliability with Proactive Error Prediction", Conference on Usenix Annual Technical Conference (2017), pp. 391-402.

Klein, "Using Machine Learning to Predict Hard Drive Failures", Backblaze Blog—Cloud Storage & Cloud Backup, Oct. 12, 2021, url: backblaze.com/blog/using-machine-learning-topredict-hard-drive-failures/ (visited on Sep. 9, 2025), 13 pages.

Chen et al., "XGBoost: A Scalable Tree Boosting System", Proceedings of the 22nd ACM SIGKDD International Conference on Knowledge Discovery and Data Mining. KDD '16. New York, NY, USA: Association for Computing Machinery, (2016), pp. 785-794.

Klein, "Backblaze Drive Stats for Q3 2022", Backblaze Blog—Cloud Storage & Cloud Backup. Nov. 1, 2022. url: https://www.backblaze.com/blog/backblaze-drive-stats-for-q3-2022/ (visited on Sep. 9, 2025), 18 pages.

Kaur et al., "Failure Prediction and Health Status Assessment of Storage Systems with Decision Trees", Advanced Informatics for Computing Research, (2019) Communications in Computer and Information Science, vol. 60, No. 3, pp. 913-946.

Chaves et al., "BaNHFaP: A Bayesian Network Based Failure Prediction Approach for Hard Disk Drives", 2016 5th Brazilian Conference on Intelligent Systems (BRACIS), (2016), pp. 427-432.

Lima et al., "Remaining Useful Life Estimation of Hard Disk Drives based on Deep Neural Networks", 2018 International Joint Conference on Neural Networks (IJCNN), (2018) pp. 1-7.

Xiao et al., "Disk Failure Prediction in Data Centers via Online Learning", Proceedings of the 47th International Conference on Parallel Processing (2018) pp. 1-10.

Ganguly et al., "A Practical Approach to Hard Disk Failure Prediction in Cloud Platforms: Big Data Model for Failure Management in Datacenters", 2016 IEEE Second International Conference on Big Data Computing Service and Applications (BigDataService) (2016), pp. 105-116.

Yang et al., "Hard Drive Failure Prediction Using Big Data", 2015 IEEE 34th Symposium on Reliable Distributed Systems Workshop (SRDSW) (2015) pp. 13-18.

Zhang et al., "Minority Disk Failure Prediction Based on Transfer Learning in Large Data Centers of Heterogeneous Disk Systems", IEEE Transactions on Parallel and Distributed Systems 31.9 (Sep. 2020), pp. 2155-2169.

Kamarthi et al., "Assessement of Current Health of Hard Disk Drives", 2009 IEEE International Conference on Automation Science and Engineering. ISSN: 2161-8089. (2009), pp. 246-249.

Eckart et al., "Failure Prediction Models for Proactive Fault Tolerance within Storage Systems", IEEE International Symposium on Modeling, Analysis and Simulation of Computers and Telecommunication Systems. ISSN: 2375-0227. (2008), pp. 1-8.

(56) References Cited

OTHER PUBLICATIONS

Wang et al., "Health monitoring of hard disk drive based on Mahalanobis distance", Prognostics and System Health Management Conference (2011). ISSN: 2166-5656. pp. 1-8.
Wang et al., "Online Anomaly Detection for Hard Disk Drives Based on Mahalanobis Distance", IEEE Transactions on Reliability, vol. 62, No. 1 (Mar. 2013). pp 136-145.
Ferraro et al., "Evaluating explainable artificial intelligence tools for hard disk drive predictive maintenance", Artificial Intelligence Review 56.7 (Jul. 1, 2023), pp. 7279-7314.
Wu et al., "Tree-Based Model with Advanced Data Preprocessing for Large Scale Hard Disk Failure Prediction", Large-Scale Disk Failure Prediction. Ed. by Cheng He et al. Communications in Computer and Information Science. Singapore: Springer, (2020) pp. 85-99.

* cited by examiner

| System Functionality | Failure Detection | Health Status Classification | Remaining Useful Life (RUL) Prediction |
|---|---|---|---|
| Illustration |   |   |   |
| Model Complexity | Low | Medium | High |
| Prediction Accuracy | High | Medium | Low |

HARD DISK DRIVE FAILURE PREDICTION METHOD

CROSS REFERENCE TO RELATED APPLICATIONS

This application claims the priority of U.S. Provisional Application No. 63/464,171 filed May 4, 2023 and entitled "Hard Disk Drive Analysis Method", the whole of which is hereby incorporated by reference.

BACKGROUND

According to maintenance logs gathered from large data centers over two years, hard disk drive failures account for 70% of server hardware failures [1]. Major causes of hard drive failure include mechanical failure, firmware or logical issues, power surges, overheating, and manufacturing defects. To prevent data loss, data centers employ various preventive maintenance measures. These measures include monitoring temperature and power supply, conducting regular data backup and disk replacement, and implementing the Redundant Array of Independent Disk (RAID) configuration. RAID 6 is a commonly used RAID configuration in the industry. It distributes data across multiple hard drives and employs dual parity information, safeguarding against the failure of up to two drives within the drive array [2]. However, permanent data loss can occur if more than two drives fail in a drive array. When replacing a single drive, the whole array needs to be put on standby mode. The time it takes for RAID reconfiguration can vary from a few hours to several days, depending on the storage capacity of the drive being replaced.

Monitoring the health status of individual disks and predicting potential failures can reduce the risk of data loss and optimize maintenance planning. Modern hard drives are equipped with a built-in health monitoring system known as SMART (Self-Monitoring, Analysis, and Reporting Technology) [3]. SMART attributes record information such as model, serial number, workload, temperature, spindle performance, and read/write error rate. The operating system continuously monitors these attributes and triggers an alarm when any value exceeds a predefined threshold. The thresholds are determined by domain experts, and the model implementation is straightforward. However, the built-in threshold method has four limitations: (1) The threshold method provides poor prediction performance, where the failure detection rate is around 3-10% when the false alarm rate is 0.1% [4]. The predefined threshold cannot capture all possible failure modes. Also, it is challenging to achieve optimal failure detection while minimizing false alarms. (2) The threshold method does not provide remaining time before a failure occurs once an alarm is set off. This time-in-advance information is desirable to plan proactive actions. (3) The threshold method fails to leverage the time series characteristics of the SMART attributes. Valuable predictive information in the attribute value trends remains untapped. (4) The threshold method overlooks the potential benefits of population statistics. Data centers host masses of hard drives operating under a controlled environment and population statistics can improve anomaly detection.

Over the past two decades, researchers have developed data-driven solutions to overcome these limitations. Initially, statistical approaches were used to model and distinguish SMART attribute distributions from operational and failure classes. The rank-sum test and reverse arrangement test were among the most effective methods [5, 6], and became the basis for feature selection in later studies. As open-source hard drive datasets became more accessible, modern machine learning techniques have outperformed statistical methods in prediction accuracy.

The most effective machine learning models for this particular use case, such as random forests [7] and Long Short-Term Memory (LSTM) recurrent neural networks [8], are often referred to as black-box models due to their lack of transparency and interpretability. This poses a challenge for the maintenance of the hard drives because it must be understood how the model comes up with a prediction to identify new failure modes and enhance maintenance actions.

SUMMARY OF THE INVENTION

Described herein are methods and systems for a hard drive failure prediction system to determine a predicted hard drive failure within a time-in-advance determined time period. The hard drive failure prediction system includes a machine-learning model, such as an XGBoost model, trained using historical hard drive operational data from a data center. The historical hard drive operation data corresponds to SMART attributes. Statistical analysis is performed to determine a set of SMART attributes most indicative of hard drive failure. The machine-learning model is trained using the historical hard drive operational data corresponding to the determined set of SMART attributes indicative of hard drive failure. The accuracy results of the machine-learning model are used to determine a time-in-advance value that balances accuracy with failure lead time. A signal length of operational hard drive data for a particular hard drive is provided as input to the trained machine-learning model and an output of the model indicates if the hard drive will fail within the time period of the time-in-advance value.

In one aspect, a computer-implemented method for predicting hard drive failure is provided. The method includes receiving operational data for a hard drive. The method also includes selecting a portion of the operational data corresponding to a time period based on a predetermined signal length. The method also includes extracting, from the portion of the operational data, input data representing a set of features indicative of hard drive health. The method also includes determining, using the input data as input to a trained hard drive failure prediction model, hard drive health output data, wherein the trained hard drive failure prediction model is trained using training data from a plurality of hard drives and wherein the training data corresponds to the predetermined signal length and a predetermined time-in-advance value. The method also includes extracting, from the hard drive health output data, a hard drive failure indicator. The method also includes determining whether the hard drive failure indicator represents failure. The method also includes, in response to determining that the hard drive failure indicator represents failure, generating an alert indicating a time span, based on the time-in-advance value, until failure of the hard drive.

In some embodiments, the method also includes, in response to determining that the hard drive failure indicator represents failure, analyzing the set of features indicative of hard drive health corresponding to the hard drive to generate an explainable dataset and generating a graphical user interface using the explainable dataset. In some embodiments, analyzing the set of features indicative of hard drive health includes using Shapley additive explanations (SHAP) analysis. In some embodiments, the operational data are Self-Monitoring, Analysis, and Reporting Technology (SMART) attributes and received from a SMART monitoring system. In some embodiments, the method also includes, prior to receiving the operational data, performing statistical analysis of the training data, determining, based on the statistical analysis, a set of SMART attributes correlated to hard drive failure, and storing the set of SMART attributes as the set of features indicative of hard drive health. In some embodiments, the set of SMART attributes includes at least one of: number of bad sectors, number of data blocks with uncorrectable errors, number of parity errors, number of unrecoverable errors using hardware error correction code, and number of sectors waiting to be remapped due to unrecoverable read errors.

In some embodiments, the method also includes, prior to receiving the operational data, determining the predetermined time-in-advance value by: executing the trained hard drive failure prediction model using the training data and a time-in-advance value, determining an accuracy value for the execution of the trained hard drive failure prediction model, determining the accuracy value exceeds an accuracy threshold value, and storing the time-in-advance value as the predetermined time-in-advance value. In some embodiments, the trained hard drive failure prediction model is an extreme gradient boosting (XGBoost) model.

In another aspect, a system for predicting hard drive failure is provided. The system includes at least one processor and at least one memory. The memory includes instructions that, when executed by the at least one processor, cause the system to receive operational data for a hard drive. The memory also includes instructions that, when executed by the at least one processor, cause the system to select a portion of the operational data corresponding to a time period based on a predetermined signal length. The memory also includes instructions that, when executed by the at least one processor, cause the system to extract, from the portion of the operational data, input data representing a set of features indicative of hard drive health. The memory also includes instructions that, when executed by the at least one processor, cause the system to determine, using the input data as input to a trained hard drive failure prediction model, hard drive health output data, wherein the trained hard drive failure prediction model is trained using training data from a plurality of hard drives and wherein the training data corresponds to the predetermined signal length and a predetermined time-in-advance value. The memory also includes instructions that, when executed by the at least one processor, cause the system to extract, from the hard drive health output data, a hard drive failure indicator. The memory also includes instructions that, when executed by the at least one processor, cause the system to determine the hard drive failure indicator represents failure. The memory also includes instructions that, when executed by the at least one processor, cause the system to, in response to determining the hard drive failure indicator represents failure, generate an alert indicating a time span, based on the time-in-advance value, until failure of the hard drive.

In some embodiments, the memory also includes instructions that, when executed by the at least one processor, cause the system to, in response to determining the hard drive failure indicator represents failure, analyze the set of features indicative of hard drive health corresponding to the hard drive to generate an explainable dataset and generate a graphical user interface using the explainable dataset. In some embodiments, analyzing the set of features indicative of hard drive health includes using Shapley additive explanations (SHAP) analysis. In some embodiments, the operational data are Self-Monitoring, Analysis, and Reporting Technology (SMART) attributes and received from a SMART monitoring system. In some embodiments, the memory also includes instructions that, when executed by the at least one processor, cause the system to, prior to receiving the operational data, perform statistical analysis of the training data, determine, based on the statistical analysis, a set of SMART attributes correlated to hard drive failure, and store the set of SMART attributes as the set of features indicative of hard drive health. In some embodiments, the set of SMART attributes includes at least one of: number of bad sectors, number of data blocks with uncorrectable errors, number of parity errors, number of unrecoverable errors using hardware error correction code, and number of sectors waiting to be remapped due to unrecoverable read errors.

In some embodiments, the memory also includes instructions that, when executed by the at least one processor, cause the system to, prior to receiving the operational data, determine the predetermined time-in-advance value, which further includes instructions to: execute the trained hard drive failure prediction model using the training data and a time-in-advance value, determine an accuracy value for the execution of the trained hard drive failure prediction model, determine the accuracy value exceeds an accuracy threshold value, and store the time-in-advance value as the predetermined time-in-advance value. In some embodiments, the trained hard drive failure prediction model is an extreme gradient boosting (XGBoost) model.

In another aspect, a computing device for predicting hard drive failure is provided. T computing device is configured to connect to a pod of hard drives in a data center. The computing device is also configured to operate as an edge computing device. The computing device is also configured to receive, using message queuing telemetry transport (MQTT) protocol, Self-Monitoring, Analysis, and Reporting Technology (SMART) data from the pod of hard drives. The computing device is also configured to select a portion of the SMART data corresponding to a time period based on a predetermined signal length. The computing device is also configured to extract, from the portion of the SMART data, input data representing a set of SMART attributes indicative of hard drive health. The computing device is also configured to determine, using the input data as input to a trained hard drive failure prediction model, hard drive health output data, wherein the trained hard drive failure prediction model is trained using training data from a plurality of hard drives and wherein the training data corresponds to the predetermined signal length and a predetermined time-in-advance value. The computing device is also configured to generate, using the hard drive health output data, a graphical user interface with a failure indicator corresponding to each hard drive from the pod of hard drives. In some embodiments, the SMART data is received in real-time from the pod of hard drives. In some embodiments, the graphical user interface further includes a visualization of SMART attributes corresponding to the failure indicator of each hard drive from the pod of hard drives. In some embodiments, wherein the set of SMART attributes indicative of hard drive health include at least one of: number of bad sectors, number of data blocks with uncorrectable errors, number of parity errors, number of unrecoverable errors using hardware error correction code, and number of sectors waiting to be remapped due to unrecoverable read errors.

Additional features and aspects of the technology include the following:

1. A computer-implemented method for predicting hard drive failure, comprising: receiving operational data for a hard drive;

selecting a portion of the operational data corresponding to a time period based on a predetermined signal length;

extracting, from the portion of the operational data, input data representing a set of features indicative of hard drive health;

determining, using the input data as input to a trained hard drive failure prediction model, hard drive health output data, wherein the trained hard drive failure prediction model is trained using training data from a plurality of hard drives and wherein the training data corresponds to the predetermined signal length and a predetermined time-in-advance value;

extracting, from the hard drive health output data, a hard drive failure indicator;

determining whether the hard drive failure indicator represents failure; and in response to determining that the hard drive failure indicator represents failure, generating an alert indicating a time span, based on the time-in-advance value, until failure of the hard drive.

2. The computer-implemented method of claim 1, further comprising:

in response to determining that the hard drive failure indicator represents failure, analyzing the set of features indicative of hard drive health corresponding to the hard drive to generate an explainable dataset; and generating a graphical user interface using the explainable dataset.

3. The computer-implemented method of claim 2, wherein analyzing the set of features indicative of hard drive health includes using Shapley additive explanations (SHAP) analysis.

4. The computer-implemented method of claim 1, wherein the operational data are Self-Monitoring, Analysis, and Reporting Technology (SMART) attributes and received from a SMART monitoring system.

5. The computer-implemented method of claim 4, further comprising, prior to receiving the operational data:

performing statistical analysis of the training data;

determining, based on the statistical analysis, a set of SMART attributes correlated to hard drive failure; and storing the set of SMART attributes as the set of features indicative of hard drive health.

6. The computer-implemented method of claim 5, wherein the set of SMART attributes includes at least one of: number of bad sectors, number of data blocks with uncorrectable errors, number of parity errors, number of unrecoverable errors using hardware error correction code, and number of sectors waiting to be remapped due to unrecoverable read errors.

7. The computer-implemented method of claim 1, further comprising, prior to receiving the operational data:

determining the predetermined time-in-advance value by:

executing the trained hard drive failure prediction model using the training data and a time-in-advance value;

determining an accuracy value for the execution of the trained hard drive failure prediction model;

determining the accuracy value exceeds an accuracy threshold value; and storing the time-in-advance value as the predetermined time-in-advance value.

8. The computer-implemented method of claim 1, wherein the trained hard drive failure prediction model is an extreme gradient boosting (XGBoost) model.

9. A system for predicting hard drive failure, comprising: at least one processor; and at least one memory including instructions that, when executed by the at least one processor, cause the system to:

receive operational data for a hard drive;

select a portion of the operational data corresponding to a time period based on a predetermined signal length;

extract, from the portion of the operational data, input data representing a set of features indicative of hard drive health;

determine, using the input data as input to a trained hard drive failure prediction model, hard drive health output data, wherein the trained hard drive failure prediction model is trained using training data from a plurality of hard drives and wherein the training data corresponds to the predetermined signal length and a predetermined time-in-advance value;

extract, from the hard drive health output data, a hard drive failure indicator;

determine the hard drive failure indicator represents failure; and in response to determining the hard drive failure indicator represents failure, generate an alert indicating a time span, based on the time-in-advance value, until failure of the hard drive.

10. The system of claim 9, wherein the at least one memory further comprises instructions that, when executed by the at least one processor, further cause the system to:

in response to determining the hard drive failure indicator represents failure, analyze the set of features indicative of hard drive health corresponding to the hard drive to generate an explainable dataset; and generate a graphical user interface using the explainable dataset.

11. The system of claim 10, wherein analyzing the set of features indicative of hard drive health includes using Shapley additive explanations (SHAP) analysis.

12. The system of claim 9, wherein the operational data are Self-Monitoring, Analysis, and Reporting Technology (SMART) attributes and received from a SMART monitoring system.

13. The system of claim 12, wherein the at least one memory further comprises instructions that, when executed by the at least one processor, further cause the system to, prior to receiving the operational data:

perform statistical analysis of the training data;

determine, based on the statistical analysis, a set of SMART attributes correlated to hard drive failure; and store the set of SMART attributes as the set of features indicative of hard drive health.

14. The system of claim 13, wherein the set of SMART attributes includes at least one of: number of bad sectors, number of data blocks with uncorrectable errors, number of parity errors, number of unrecoverable errors using hardware error correction code, and number of sectors waiting to be remapped due to unrecoverable read errors.

15. The system of claim 9, wherein the at least one memory further comprises instructions that, when executed by the at least one processor, further cause the system to, prior to receiving the operational data:
   determine the predetermined time-in-advance value, further including instructions to:
      execute the trained hard drive failure prediction model using the training data and a time-in-advance value;
      determine an accuracy value for the execution of the trained hard drive failure prediction model;
      determine the accuracy value exceeds an accuracy threshold value; and store the time-in-advance value as the predetermined time-in-advance value.

16. The system of claim 9, wherein the trained hard drive failure prediction model is an extreme gradient boosting (XGBoost) model.

17. A computing device for predicting hard drive failure, the computing device configured to:
   connect to a pod of hard drives in a data center;
   operate as an edge computing device;
   receive, using message queuing telemetry transport (MQTT) protocol, Self-Monitoring, Analysis, and Reporting Technology (SMART) data from the pod of hard drives;
   select a portion of the SMART data corresponding to a time period based on a predetermined signal length;
   extract, from the portion of the SMART data, input data representing a set of SMART attributes indicative of hard drive health;
   determine, using the input data as input to a trained hard drive failure prediction model, hard drive health output data, wherein the trained hard drive failure prediction model is trained using training data from a plurality of hard drives and wherein the training data corresponds to the predetermined signal length and a predetermined time-in-advance value; and
   generate, using the hard drive health output data, a graphical user interface with a failure indicator corresponding to each hard drive from the pod of hard drives.

18. The computing device of claim 17, wherein the SMART data is received in real-time from the pod of hard drives.

19. The computing device of claim 17, wherein the graphical user interface further includes a visualization of SMART attributes corresponding to the failure indicator of each hard drive from the pod of hard drives.

20. The computing device of claim 17, wherein the set of SMART attributes indicative of hard drive health include at least one of: number of bad sectors, number of data blocks with uncorrectable errors, number of parity errors, number of unrecoverable errors using hardware error correction code, and number of sectors waiting to be remapped due to unrecoverable read errors.

BRIEF DESCRIPTION OF THE DRAWINGS

FIG. 9A is a high-resolution performance landscape and FIG. 9B is a contour map of performance landscape, in accordance with some embodiments.

FIG. 11A illustrates a waterfall graph that indicates the SMART 187 Mean was a significant contributor to the failure prediction. FIG. 11B illustrates a waterfall graph that indicates the key failure indicator is the mean value of SMART 184. FIG. 11C illustrates a graph that has no SMART attribute changes over the monitoring period and thus is in an operational state.

DETAILED DESCRIPTION OF THE INVENTION

Figure 1:
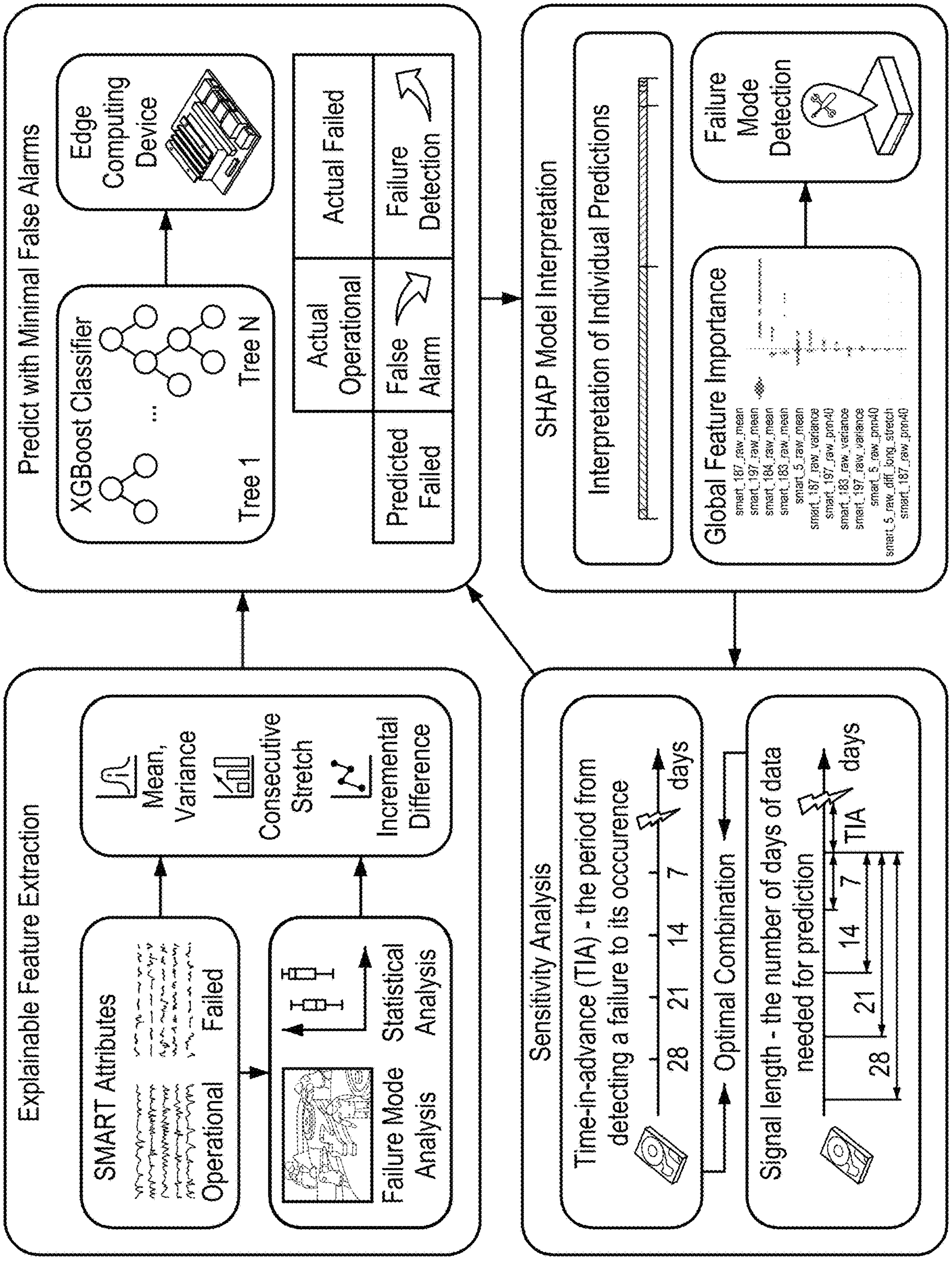
FIG. 1 illustrates an overview of the process performed by the hard drive failure prediction system to determine a hard drive failure prediction and provide an explainable prediction, in accordance with some embodiments.

The methods and techniques described herein include a model framework that addresses the limitations of existing models. As shown in FIG. 1, first, the SMART attribute trend is analyzed and explainable time series features are extracted that indicate hard drive deterioration. These features reflect central tendency, dispersion, consecutive stretch, and incremental difference of SMART time series and are selected based on failure mode analysis and statistical analysis. Second, accurate failure detection is achieved while minimizing false alarms by tuning extreme gradient boosting (XGBoost), the decision-tree-based boosted model. The selected model strikes a balance between test performance, generalizing ability, and computational complexity. Third, the feature impact behind each prediction is determined using Shapley additive explanations (SHAP) analysis, a global model interpretation technique. Also considered is the mechanism of hard drive failure when interpreting feature importance. Fourth, sensitivity analysis is conducted on the time window length (the amount of data needed for scoring) and the time-in-advance (the time before the failure occurs). An optimal setting for these parameters is determined to better understand the failure mechanism and achieve accurate and timely failure predictions.

The hard disk drive failure prediction problem falls under the standard scope of the Prognostics and Health Management (PHM). The PHM lifecycle may be divided into three phases, namely design, development, and decision (DE3) [9].

The design phase includes three stages: system function design, framework design, and verification & validation design [9]. The design phase may include a thorough analysis of the PHM system function, its interaction with other systems, and the quantitative benefits it provides. For hard drive failure prediction, the PHM system function may be one of the three types: failure detection, health status classification, or remaining useful life (RUL) prediction. The modeling framework is then established by selecting inputs, machine learning algorithms, and designing hardware infrastructure. Finally, during the verification & validation stage, specific indicators are designed to evaluate the effectiveness of the system.

Figure 2:
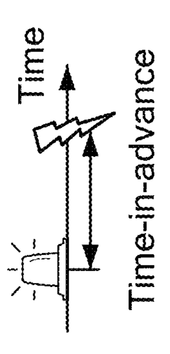
FIG. 2 illustrates a comparison of three model functions: failure detection, health status classification, and remaining useful life prediction, in accordance with some embodiments.
Figure 2:
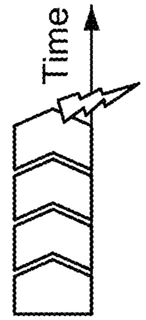
Figure 2:
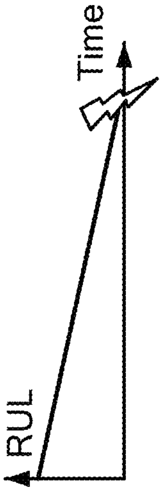

As part of the system function design, FIG. 2 illustrates the three system functions and their respective comparison. At a data center, a hard drive is labeled as 'failed' if it is replaced due to loss of connection or has a high bad sector count. A common system is the failure detection system, which predicts potential failure in advance. In comparison, the health status classification system labels a hard drive's health state by dividing its remaining useful life in segments and performs multi-class classification [10, 11, 12]. Lastly, the RUL prediction system forecasts the time remaining before a hard drive fails [8, 13, 14]. Although each function has its unique benefits, the failure detection system generally provides accurate predictions with simpler models by capturing short-term changes in SMART attribute behaviors.

The hard drive failure prediction system works in conjunction with other subsystems as part of data center information technology (IT) infrastructure. The threshold-based model framework utilizes SMART sensor signals as input, to determine and then display the health status on the operating system. Recent publications have improved upon this model framework and enhanced its modeling capacity. An enhanced model is usually trained offline with data from a drive population to capture the SMART attribute distribution. The trained model then scores incoming data on the operating system. This enhanced framework does not require additional hardware. The computational requirement of the operating system depends on the complexity of the trained model. Novel frameworks have been developed to further enhance modeling capability. One group of novel frameworks facilitates online learning to prevent model aging. A particular online learning framework proposed using online random forests (ORF) to address the disk class imbalance problem [15]. The online bagging strategy selects records from the failed class to update the model more frequently than those from the operational class. The concept drift phenomenon in the hard drive population may be observed, where the statistical patterns of SMART attributes change over time and the change is unpredictable [16]. To detect concept drift, the online learning model Stream disk failure prediction (StreamDFP) was developed with state-of-the-art incremental learning algorithms. The other group of frameworks involves combining system-level signals with SMART attributes. In one instance, Microsoft Azure was used to combine workload performance counters with SMART attributes to improve prediction accuracy and achieved success in their experiments [17]. However, there were difficulties in implementing the system due to the need for third-party data and hardware divergence in production. In another instance, a Cloud Disk Error Forecasting (CDEF) system incorporated system-level signals, such as Windows events and file system operation errors, with SMART attributes as input [18]. By combining these signals, the prediction accuracy increased. Overall, retrofitting the hard drive failure prediction system leads to a tradeoff between the framework novelty and implementation difficulty. These novel frameworks demand real-time memory and processing capacity, which challenges their scalability at a large-scale data center.

To validate the prediction accuracy and to compare with other published models, failure prediction models have been trained and tested on open-source data. The SMART dataset from the Center of Magnetic Recording Research (CMRR) at the University of California San Diego (UCSD) [4] is the first open-source SMART dataset. The dataset contains 369 hard drives, out of which 191 have failed. The SMART attributes were sampled every two hours, and the most recent 25 days of records were kept. In some instances, the operational disk data was from a reliability demonstration test run and the failed disk data was collected from the field. Thus, in some instances the model may be trained to differentiate between the two classes would be based on the difference between operation environments instead of disk performance. A common dataset in publications is the Backblaze SMART dataset. The Backblaze datacenter has been releasing SMART data collected from more than 100,000 hard drives from various models quarterly [19]. The large data volume allows researchers to extract subsets that match their modeling goals. Other non-open-source data from commercial data centers include Microsoft Azure [17, 18], EMC Corporation [20], Baidu [21, 22], Tencent [23], and others [24]. A small-scale run-to-failure test may be performed to identify hard drive failure indicators [20]. When evaluating the performance of hard drive failure prediction models, the Failure Detection Rate (FDR) and False Alarm Rate (FAR) are the preferred metrics. A Markov model may be used to demonstrate that with a relatively low detection rate of around 40%-50%, the reliability of the overall system in RAID configurations can be significantly improved [26]. Therefore, the focus is on achieving the highest possible FDR and on controlling the FAR to avoid unnecessary disk replacements. Other performance evaluation metrics focus on data migration, which often comes into play when a disk failure occurs. Migration rate and mis-migration rate are proposed to measure protected and lost data, but this may not apply to disks that are configured with RAID [27]. A metric was developed that estimates the virtual machine migration cost at a data center by considering both unnecessary migration cost and data loss cost [18]. A cost-sensitive ranking model was trained to detect hard drive failure.

In the development phase, technical details of the designed architecture are established and tested. In the hard drive failure prediction system, the focus of the phase is on training the machine learning model, with models ranging from Failure Modes, Mechanisms, and Effects Analysis (FEMMA) to data-driven deep learning models.

Figure 3:
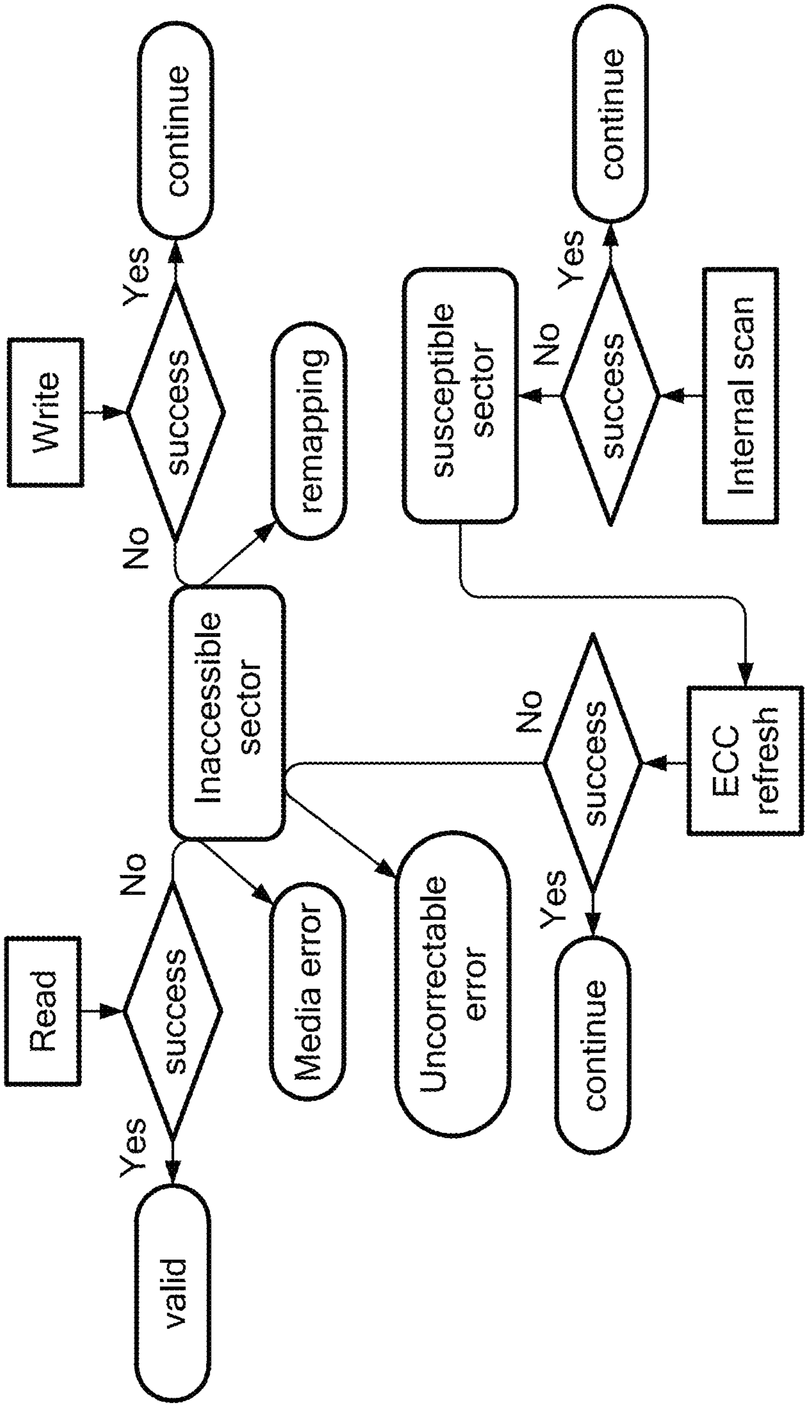
FIG. 3 illustrates a flowchart for a hard disk drive sector error transition and different responses to the sector errors, in accordance with the prior art [20].

Failure mechanisms refer to the ways by which physical, electrical, and mechanical stressors can lead to failures. The indicators of these stressors can help predict potential failures. The UCSD hard drive dataset was analyzed using the FMMEA data sheet and identified high-risk failure modes like head crashes, disk scratches, and head offtrack [28]. SMART features that were correlated with these high-risk failure mechanisms were chosen, and a Mahalanobis-distance-based model was applied to detect anomalies [29]. Similarly, SMART data was analyzed from 433 failed hard drives from a real-life data center and classified failure modes as logical, bad sector, or read/write head failures [24]. Then the failure degradation signatures were calculated for each failure mode and used to predict the degradation stage of the hard drive. Additionally, sector errors were demonstrated to be highly correlated with whole-disk error through domain expertise and extensive data analysis [20]. FIG. 3 shows the flowchart of the section error transition and different responses to sector errors. This information was utilized to create RAIDShield, a system that monitors the health of disks by keeping track of redundant sectors and proactively identifying unstable disks.

The distribution of SMART attribute from the operational class and the failed class was initially modeled using statistical models. The Naïve Bayes Expectation-maximization (NBEM) achieved a 30% failure detection rate, which was three times better than the threshold-based model at the same false positive rate [30]. Non-parametric statistical tests, namely rans-sum and reverse arrangements test, may be used to capture SMART attributes that display significant trends for most failed drives and close to no trends for operational drives [4, 5, 6]. Hidden Markov Models (HMMs) and Hidden Semi-Markov Models (HSMMs) may be used for both operational and failed disk SMART time series [31]. A test record may be classified based on which model fits better. Logistic regression may be utilized with Li regularization and to observe enhanced prediction performance after incorporating SMART time series features [22]. In some instances, decision trees are preferable in this application because they may capture the combined effects of multiple SMART features and are inherently interpretable. Failure prediction systems were proposed based on classification trees that achieved a high failure detection rate of over 90% with a low false alarm rate of less than 1% on real-life large-scale datasets [12, 32, 33]. Specifically, both trees used "Power-on Hours" as a predictive feature. "Power-on Hours" was found to be a more preferable feature, with a feature importance measurement five times higher than the second most important feature [12]. While these findings reflect genuine data patterns, the observed inverse correlation between age and failure likelihood is counterintuitive and requires a nuanced explanation. Based on analysis of the Backblaze dataset, the classification tree indicates that the top SMART features that distinguish two classes include 197 (Current Pending Sector Count), 187 (Reported Uncorrectable Errors), 5 (Reallocated Sectors Count), and 188 (Command Timeout) 34]. Similarly, an optimal survival tree applied to a year of Backblaze data and may indicate the most important features are SMART 5, 187, 3 (Spin-up Time), 190 (Temperature Difference), 7 (Seek Error Rate), and 188 [35]. These results align well with the failure mechanism analysis. Given many successes in accurate failure prediction with basic models, ensemble models provide accurate predictions because they aggregate results from basic models. Some successful ensemble model structures for hard drive failure prediction include a Combined Bayesian Network (CBN) consisting of four basic classifiers [111], a two-stage model combining a decision tree and a logistic regression model [17], AdaBoost with transfer learning capacity [23], and random forests [7].

Moreover, neural network models have been investigated for predicting hard disk drive failures. The use of a convolution neural network and LSTM (CNN+LSTM) model emphasized the importance of integrating server performance and location information [36]. A recurrent neural network (RNN)-based model that treats SMART attributes as sequence data [10], had results showed that the RNN-based model outperformed sequence-independent models. A temporal CNN model that combines daily SMART input and recent SMART time series features as input [37] showed that the temporal CNN performed better than LSTM models due to its resilience to noise. During the development phase of the hard drive failure prediction system, two major challenges arise: the data imbalance challenge and the model update/generalization challenge.

In response to the data imbalance challenge, both undersampling and oversampling techniques have been explored. Undersampling methods may reduce the number of samples from the majority class to balance the dataset [16, 23, 38]. On the other hand, oversampling techniques may inflate the number of samples from the minority class [12, 39]. Another approach to addressing the data imbalance challenge is the use of an improved loss function. In an instance, a loss function that combines the binary cross-entropy with a sign function [37], where the modified loss function allocates more loss and gradients to false alarm samples, thereby reducing the impact of false positives and improving the model's ability to distinguish between healthy and failing disks. Moreover, techniques to enhance data volume and extract feature have been explored. A SMART-GAN method is proposed, which leverages generative adversarial networks (GANs) to increase the data volume for both classes [40]. By generating synthetic samples, SMART-GAN successfully expanded the dataset and improved the performance of the random forest model.

In response to the model update/generalization challenge, various strategies have been proposed to enhance model training and generalization capabilities. One approach is the adoption of the instances map to disk algorithm (IMDA) [23]. IMDA classifies the health state of a disk as a failure if any of the past 14 days of records are classified as failures. By considering historical information, IMDA provides a more comprehensive assessment of disk health and aids in timely failure prediction. Furthermore, online training techniques are proposed specifically for random forest models [15]. Poisson distributions are introduced to model the sequential arrival of positive and negative samples, giving a smaller chance for negative samples to be selected for model updates. This selective updating strategy ensures that negative samples are balanced with positive samples during training, improving the overall performance of the model.

Another approach uses active learning and semi-supervised learning models. A framework developed called StreamDFP, which incorporates active learning and semi-supervised learning to select suitable samples for training [23]. The learners predict samples in learning windows, and the results are used as references for online labeling. This approach leverages the iterative process of active learning and semi-supervised learning to improve the model's classification ability and adapt to evolving data patterns. To address the model generalization challenge, techniques are considered such as normalizing SMART attribute distributions across different drive models [37]. This normalization process enables the training of a single model that can be applied to various drive models, thereby improving the model's generalization capability. Additionally, transfer learning methods have been investigated to achieve cross-model training [23]. By selecting a majority model with a similar attribute distribution as the minority model, knowledge transfer may be facilitated, enabling effective training on minority drive models.

In the final phase of the proposed PHM framework, the focus shifts to making informed maintenance decisions based on the outcomes predicted by the model. This decision-making process leverages the accumulated knowledge from the earlier stages to optimize maintenance actions and ensure efficient resource allocation. One approach to inform maintenance actions is the adoption of a rule-based disk replacement policy [38]. This policy sets guidelines for determining when a disk should be replaced based on predefined rules. By considering factors such as failure predictions, historical data, and specific thresholds, this policy assists in making timely replacements and reducing the risk of catastrophic failures. To further optimize maintenance actions, adapting the speed of the scrubber is proposed based on error predictions. In one approach, the scrubber's speed is adjusted based on the predicted errors [41]. However, this approach has two limitations: it may slow down the system's overall performance and introduce new errors. Despite these limitations, this adaptive approach offers the opportunity to fine-tune maintenance actions based on real-time error predictions, thereby enhancing system reliability, and minimizing downtime.

Moreover, the utilization of the optimal survival tree offers an interpretable path to failure detection [35]. This tree-based model predicts the time to failure and provides insights into the factors and patterns contributing to the failure. Another form of interpretable approach is using a global model interpretation method that decodes the prediction results from non-interpretable model. Shapley additive explanations (SHAP) and local interpretable model-agnostic explanations (LIME) may be used to analyze the SMART feature importance [43]. The model-agnostic approach leaves space to integrate crafted features and model training techniques to create a more customized and nuanced solution. This may have the desired real-world result of maintenance staff trusting the model outcomes and confidently making maintenance decisions based on the insights provided.

Figure 4:
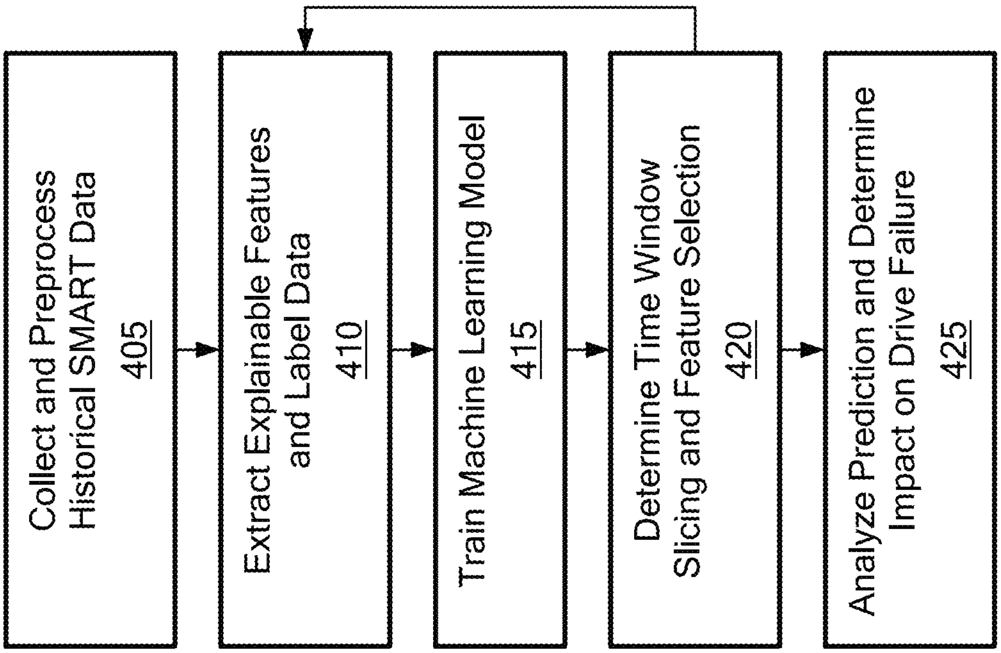
FIG. 4 illustrates a process for historical data management, feature engineering, and model training, in accordance with some embodiments.
Figure 5:
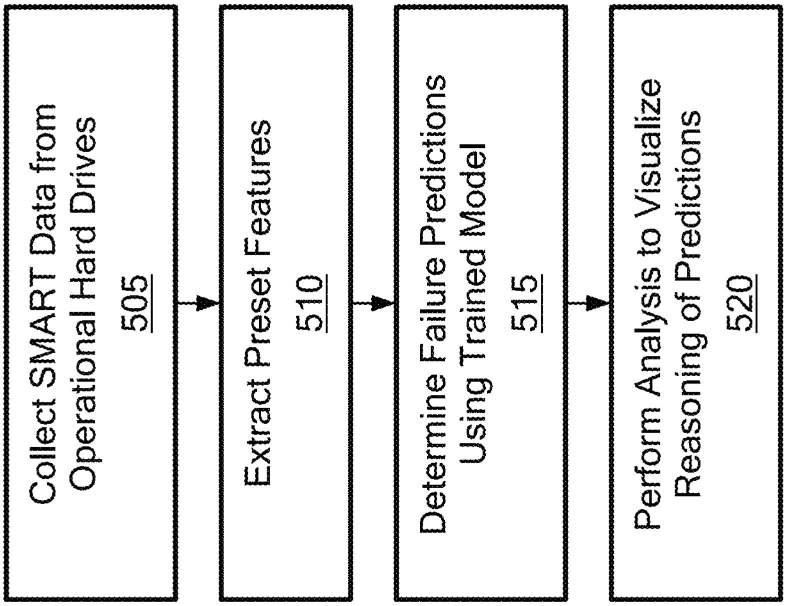
FIG. 5 illustrates an example process for drive failure prediction and visualization, in accordance with some embodiments.

The explored techniques highlight the need for a model framework that can be retrofitted into existing data center management system, predicts failure accurately with a low false alarm rate, and offers transparency and interpretability. The methods and techniques described herein are for a hard drive failure prediction system that is configured to receive hard drive operational data (e.g., SMART data) and extract key features for processing by a trained machine learning model (e.g., XGBoost model) to determine a hard drive failure prediction with explainable reasoning behind the prediction. FIG. 4 illustrates an example process for training the machine learning model and FIG. 5 illustrates an example process for the model explanation technique used for the hard drive failure prediction system.

FIG. 4 illustrates a process for historical data management, feature engineering, and model training of the hard drive failure prediction system. At operation 405, historical hard drive operational data, such as SMART data, may be collected from a data center. For example, a data center may utilize a SMART data management tool used for extracting the hard drive data. The historical hard drive operational data may be preprocessed tuning parameters such as the signal length and the time-in-advance. The signal length is tuned, or adjusted, to compensate for the data storage cost. As described in detail below, the signal length is tuned to find a balance between providing sufficient data for training the model with accurate results and storing data that is not cost prohibitive. The time-in-advance is tuned to find a balance between the model accurately predicting a failure and the earliest point that it is possible to make such a prediction. In other words, it is desirable to predict a failure as far into the future as possible, but the farther the time into the future, the less accurate the prediction may be. Thus, the time-in-advance may be tuned to find a time period (e.g., the time-in-advance) that will provide sufficient notification that a hard drive is going to fail (i.e., time for the hard drive to be replaced by the maintenance team) but also provide an accurate prediction. Further, by setting a time-in-advance and excluding data beyond that point, the machine-learning model is prevented from being exposed to data that it would not encounter in real-world operations. This helps the model avoid creating false correlations between failure signals and failure status.

At operation 410, the explainable features are extracted from the SMART data and the data is labeled. The feature extraction is both data-driven and failure-mechanism driven. The operation 410 may include a statistical analysis to correlate the features extracted by catch-22 from the SMART time series with failures and identify the features that have the most relevance to explaining a hard drive failure. The operation 410 may further include failure mode analysis to guide toward features related to mechanical failures, such as high temperature, logical failures, and sector errors. Additionally, the historical hard drive data may be labeled, such as an indication of operational or failed, for training the machine-learning model.

At operation 415, the machine-learning model is trained using the extracted and labeled hard drive operational data. As described below, the extreme gradient boosting (XGBoost) model may be selected as the model. The signal length and time-in-advance that is selected for the amount of historical data to train the machine-learning model will thus infer the time period that the machine-learning model may perform failure predictions. For example, if the signal length is thirty days, then the machine-learning model may be trained with thirty days of historical data, and thus failure predictions may be based on a failure occurring within a time period determined by the time-in-advance.

At operation 420, based on the training and performance of the machine-learning model, time window slicing and feature selection may be further determined. The time window slicing and feature selection may be provided back to operation 410 to further refine the feature extraction and then further train the machine-learning model at operation 415 with more historical data based on the refined feature extraction.

At operation 425, the prediction results generated may be analyzed and used to determine the impact on drive failures. A SHAP analysis may be performed to explain the failure prediction. SHAP analysis may reveal which features contribute the most to the failure prediction on both the population level and the individual hard drive level.

FIG. 5 illustrates a process for drive failure prediction and visualization of the hard drive failure prediction system. The process illustrated in FIG. 5 may be used to predict the potential failure of one or more hard drives based on the collected historical data of the hard drives. At operation 505, SMART data may be collected from operational hard drives, such as hard drives in a particular data center or hard drives that are part of a particular cluster in a data center. From the model training stage (e.g., operations 405 and 420), the signal length may be established. Therefore, the data center may limit the amount of data saved to the predetermined number of data points that correspond to the determined signal length. In such scenarios, the data center may choose to remove the oldest day's data whenever a new day's data is added to maintain the signal's length and prevent an increase cost of storage.

At operation 510, the preset SMART features may be extracted from the operational hard drive data. In the model training process, such as operation 410, the SMART data was analyzed to determine the features with the most relevance to hard drive failure. Thus, at operation 510, the selected SMART features may be extracted from the operational hard drive data (e.g., SMART time series data) to be used as the input for the model.

At operation 515, the selected SMART features of the operational hard drive data may be provided to the trained machine-learning model as input and the model may determine failure predictions corresponding to the hard drives of the input data. The model input may be in the form of a data table, where each row represents a hard drive and each column includes a feature. The trained XGBoost model may take the input table and classify each hard drive with a failure prediction or an operational prediction. When a hard drive is classified with a failure prediction, that is an indication that the data indicates the hard drive will fail in the number of days determined by the time-in-advance. For example, if the time-in-advance is set to seven days, then the hard drive is likely to fail within seven days. For real-world applications, the time-in-advance is adjusted to provide the most accurate predictive results while also providing sufficient time for the hard drive to be replaced.

Figure 9A:
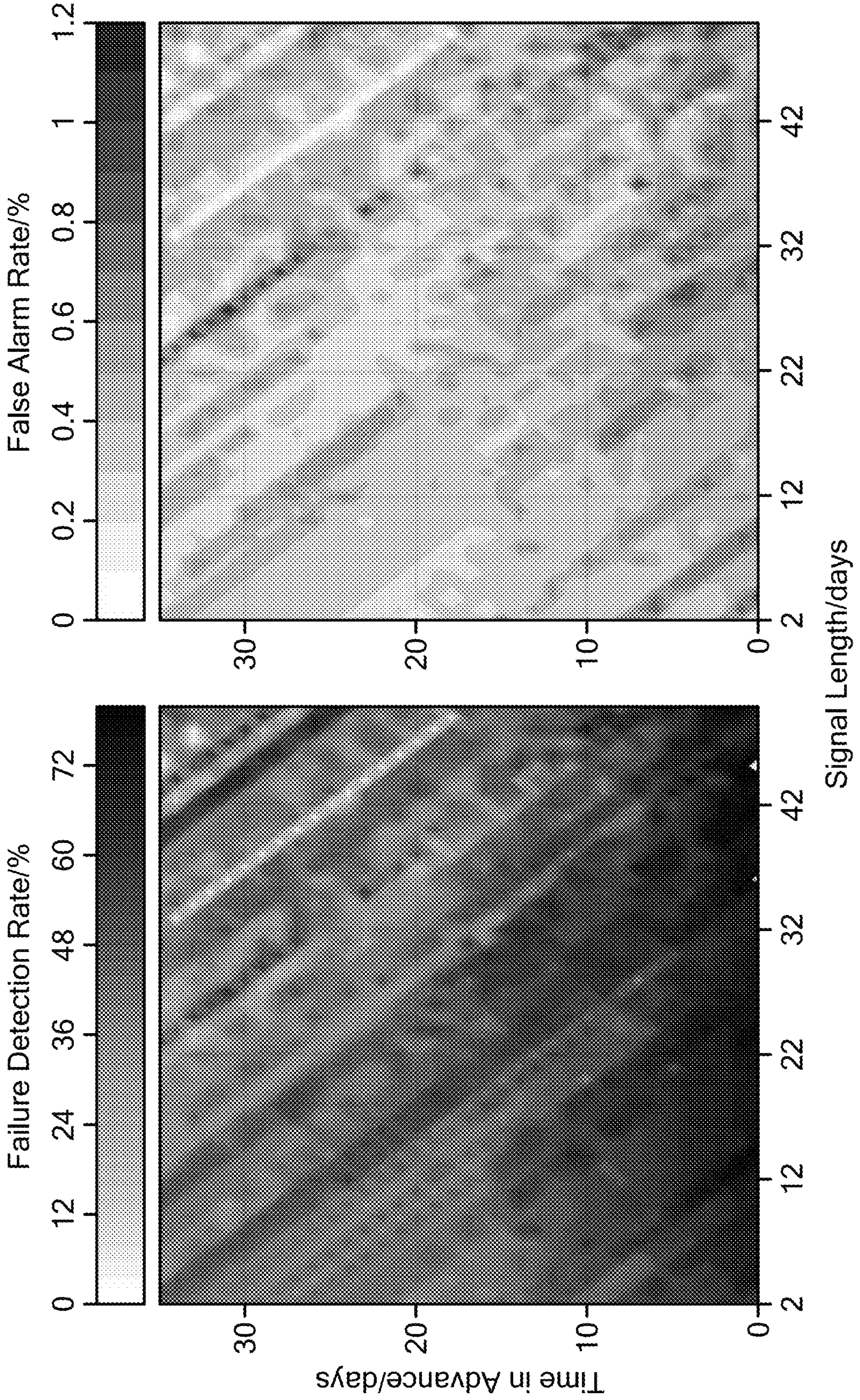
FIGS. 9A and 9B illustrate the impact of signal length and time-in-advance on the model performance for failure detection rate and false alarm rate, where
Figure 9B:
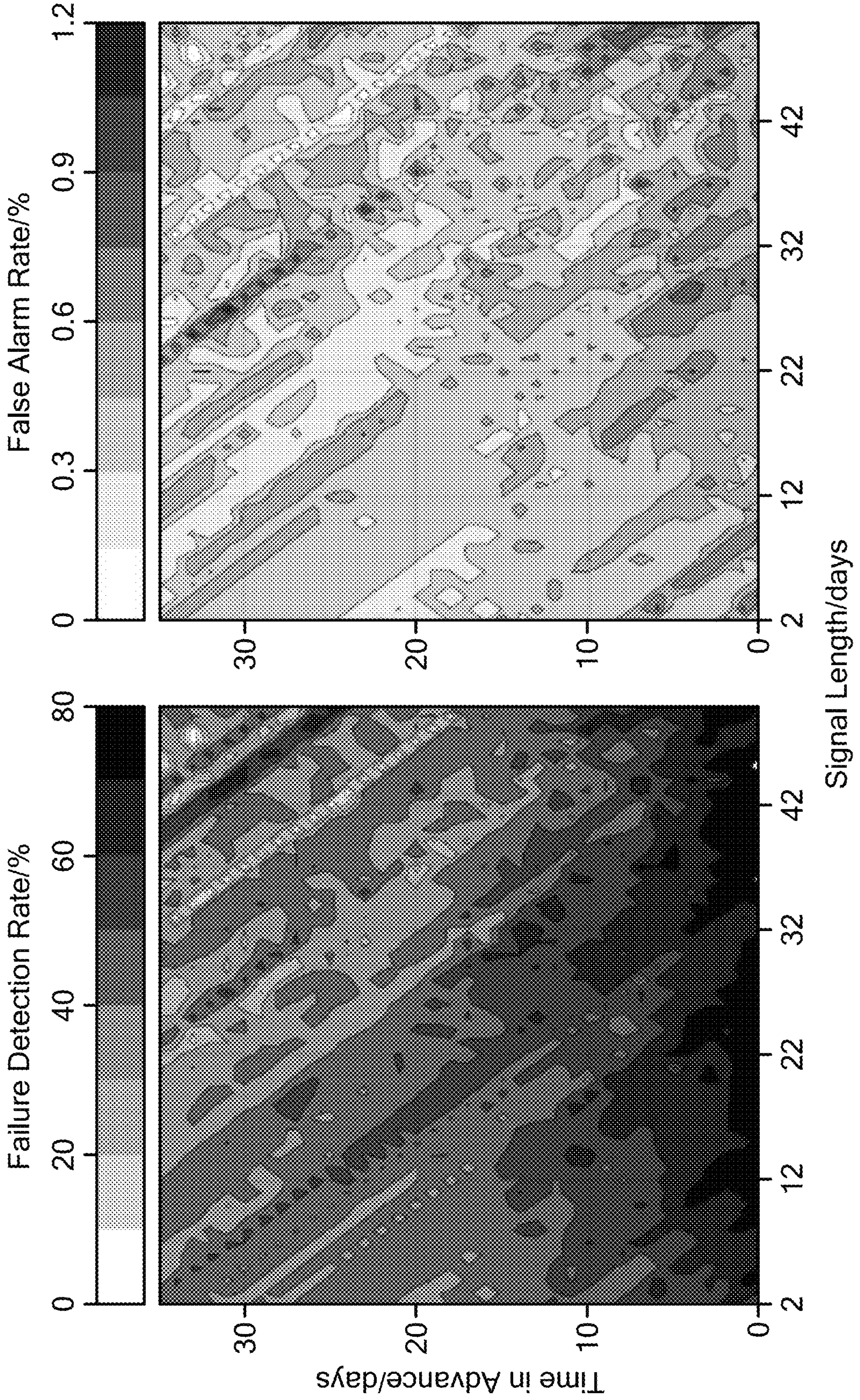
Figure 10:
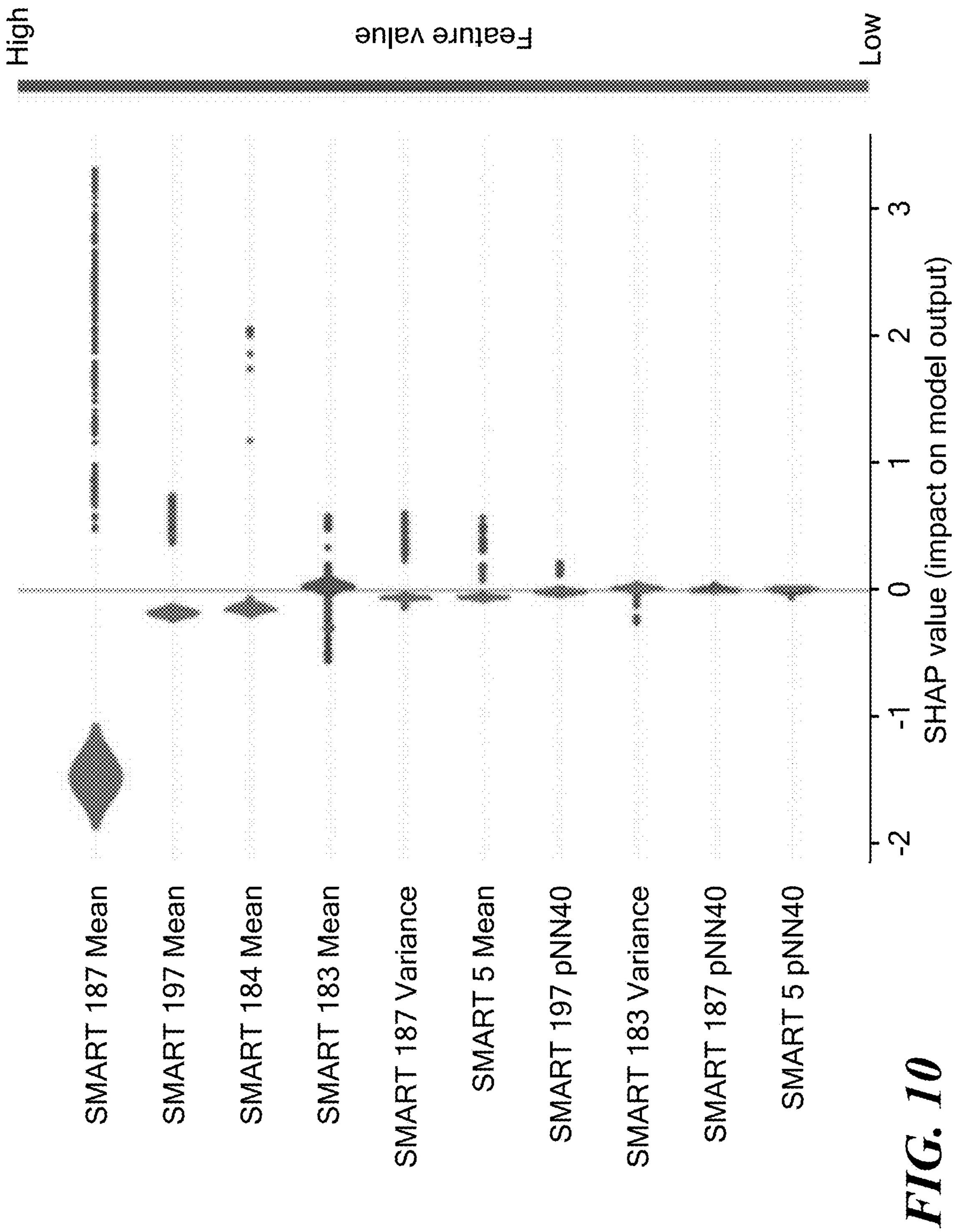
FIG. 10 illustrates a SHAP summary plot and provides an overview of how each feature affects the likelihood of hard drive failure, in accordance with some embodiments.

At operation 520, analysis is performed to generate a visualization of the reasoning for the predicted hard drive failure. After the execution of the model with the operation hard drive data as input, a SHAP analysis may be performed to explain the prediction result, such as identifying the SMART features that were most indicative of the predicted failure. For example, a maintenance crew of a data center may run the SHAP analysis to explain the prediction results. FIG. 10 illustrates an example of the global feature interpretation and FIGS. 9A-9C illustrate three examples of individual failure interpretation.

A computing device, such as the NVIDIA Jetson Nano, may be configured with the hard drive failure prediction system. The hard drive failure prediction system may scale the computational infrastructure (e.g., the computing device) based on the size of the hard drive population (e.g., data center). In some embodiments, the hard drive failure prediction system may be trained and tested through cloud services.

The hard drive failure prediction system may be implemented on an edge computing device. Implementing on an edge computing device instead of a central server may provide advantages in scalability, data privacy, and operational resilience.

In common data centers, hard drives may be organized in pods. Pods of hard drives are connected to form larger units. If the hard drive failure prediction system was configured as part of a centralized server or the cloud, then the SMART data from each hard drive may be constantly transmitted to the central server. Instead, by using an edge computing device, the edge computing devices may be small but include powerful processors that are embedded in each pod or shelf, thus resulting in the failure prediction to execute locally without burdening central resources. This approach enhances data security and enables continuous local operation, even during network disruptions.

The edge computing device executing the hard drive failure prediction system may collect SMART data from the operational hard drives of a pod using message queuing telemetry transport (MQTT) as the publish/subscribe architecture. The MQTT protocol is a standardized communication protocol utilized by the Organization for the Advancement of Structured Information Standards (OASIS) and International Organization for Standardization (ISO) that provides a scalable and reliable way to connect devices with a small code footprint and minimal network bandwidth. The hard drives of the pods are configured as the publisher and the edge computing device as the subscriber. The edge computing device receives SMART data from the hard drives in real-time.

Extreme gradient boosting (XGBoost) is an implementation of a gradient boosting model that utilizes decision trees as its base learner [44]. The performance of the gradient boosting model is based on training the base learner sequentially to minimize the loss function. The XGBoost model may be used for its performance and the ability to scale on many commercial computation systems. The data processing pipeline transforms raw time series data into a tabular format, where each row represents a hard drive, and each column represents a crafted time series feature. The XGBoost binary classifier may be used to model hard drive failure data and quantify the significance of features through SHAP analysis. To avoid data dredging and ensure the validity of the results, data may be used from Q1 and Q2 2023 for training and Q3 2023 for testing. Given that the data is imbalanced, a random undersampling is applied to the operational class in the training set to prevent bias in the model towards the operational class.

When the training dataset is reduced in size through undersampling, there is an increased risk of the model overfitting. The XGBoost classifier has several hyper-parameters that are adjustable to control the regularization effect. A grid search combined with cross-validation is applied to find the optimal combination of hyper-parameters.

The XGBoost model generates a feature importance graph that ranks features based on their weights. However, the feature importance does not directly account for the magnitude or direction of a feature's effect, and the feature ranking does not provide information about individual predictions. To examine both the global effect of each feature and the reasoning behind individual predictions, the Shapley additive explanations (SHAP) analysis is used as the model interpretation method.

SHAP is a model interpretation method that applies the classic Shapley value from cooperative game theory to assign importance scores among individual features based on their marginal contribution to the prediction result [45]. Given a prediction model f, the classic Shapley regression trains the model on all feature subsets $S \subseteq F$, where F is the set of all features [46]. The prediction for a specific input x from a model trained with feature i is $f_{S\cup\{i\}}(x_{S\cup\{i\}})$, and the prediction for x from a model trained with feature i withheld is $f_S(x_S)$. The difference between two prediction results evaluates the marginal effect of feature i. The Shapley value of feature i is calculated as a weighted average of prediction differences for all possible subsets $S \subseteq F\backslash\{i\}$:

$$\phi_i = \sum\nolimits_{S\subseteq F\backslash\{i\}} \frac{|S|!(|F|-|S|-1)!}{|F|!}[F_{S\cup\{i\}}(x_{S\cup\{i\}}) - f_s(x_s)] \quad (1)$$

Shapley values satisfy three important properties: local accuracy, consistency, and missingness, which in turn results in a single unique solution of score attribution. The local accuracy property (shown in equation 2) states that the Shapley value for each feature i sums up to the model prediction f(x), ensuring the attribution accuracy for any specific input.

$$f(x) = \phi_0(f) + \sum_{i=1}^{|F|} \phi_i(f, x) \quad (2)$$

The consistency property states that the Shapley value of feature i will not decrease when this feature's contribution to the prediction increases or stays the same as the model changes. Given model f and f', if the condition in equation 3 is satisfied for all feature subset S, the important score attribution retains the consistent trend, that is $\phi_i(f',x) \geq \phi_i(f,x)$.

$$f'_x(S) - f'_x(S \backslash i) \geq f_x(S) - f_x(S \backslash i) \quad (3)$$

The missingness property states that feature with no effect on the predicted value should have a Shapley value of 0. Thus, if $f_x(S \cup i) = f_x(S)$ for all feature subset S, $\phi_i(f,x)=0$ S, $\varphi i(f,x)=0$. This property ensures non-contributing features do not receive undue importance, which can lead to misleading prediction and operational decisions.

SHAP evolves from the classic Shapley values by approximating $f_S(x_S)$ in equation 1 with the conditional expectation function $E[f_S(x)|x_S]$. The iterative calculation starts with setting all feature values to zero. Then the features in S are introduced one at a time to calculate the conditional expectation and record their contribution to the prediction. The SHAP value of a feature i is the average conditional expectation value over all feature orderings.

In addition, SHAP analysis quantifies pairwise feature interactions through Shapley interaction index [47]. Given feature i and j, the Shapley interaction value $\phi_{i,j}$ is:

$$\phi_{i,j} = \sum_{S \subseteq F \backslash \{i,j\}} \frac{|S|!(|F| - |S| - 2)!}{2(|F| - 1)!} [f_{S \cup \{i,j\}}(x_{S \cup \{i,j\}}) - f_{S \cup \{i\}}(x_{S \cup \{i\}}) - f_{S \cup \{j\}}(x_{S \cup \{j\}}) + f_s(x_s)] \quad (4)$$

The interaction value $\phi_{i,j}$ is equal to $\phi_{j,i}$, and the total interaction effect between i and j is $\phi_{i,j}+\phi_{j,i}$.

Computational complexity is a constraint for SHAP calculations, especially with a large input dataset with many features. Since SHAP values are model-specific, approximation methods are used for various model types to calculate SHAP values efficiently. For the system described herein, the TreeExplainer [48] method was implemented to complement the XGBoost model. This may be performed under Python 3.8 environment. The Scikit-learn library [49], XGBoost [44] and SHAP [48] packages are utilized for model training, evaluation, and interpretation.

A fundamental step towards developing an artificial intelligence (AI) system that aligns with human values is to prioritize explainability in system design and implementation [49]. In some embodiments, the hard drive failure prediction system prioritizes explainability on three levels: the feature, the prediction, and the policy.

At the feature level, the SMART attribute trends are analyzed and derive time series features that are indicators of hard drive deterioration. These features are rooted in established domain knowledge, offering interpretable metrics for domain experts.

At the prediction level, the XGBoost model is used for its balance between prediction accuracy and implementation complexity, and then supplementing the model outcome with SHAP analysis, which disentangle each prediction into contributions from individual features. Through examination of these contributions, the model's rationale is compared with ground truth and human judgment. If the model emphasizes the right features in its predictions, it indicated greater trust in the system. However, if discrepancies arise, SHAP analysis is used to identify the issues, and adjust the model to better align with human understanding and interests. This comparison serves as a validation method, ensuring that the model's predictions resonate with domain expertise and industry knowledge.

At the policy level, rigorous sensitivity analyses on both the signal length and the time-in-advance parameters were used to identify a region with high performance stability. This region guarantees that there is a segment of signals containing the key time series features related to a failure, and the model performance tolerates data preprocess parameter changes.

The quality of data directly impacts prediction and insights. Input data for hard drive failure analysis usually comes from three data sources: data centers, retail merchants, and accelerated degradation experiments. In this instance, the training data is used from the Backblaze data center. As a cloud data storage company, Backblaze monitors the SMART attributes of large numbers of hard drives in controlled operating conditions. The SMART attributes of the hard drives are recorded daily and published quarterly, making the Backblaze dataset an extensive public dataset of the hard drive SMART time series. The historical statistics indicate that the failure rate differs greatly across models, and some SMART attributes have inconsistent meanings across brands. Therefore, records may be grouped by model, in this instance the Seagate ST4000DM000 was used to analyze the prognostic features. Representing 8% of total drive counts, ST4000DM000 contributed the most disk failures among all models in Q3 2023 for Backblaze. Despite relatively high failure rates, it is the fourth most used drive model in Backblaze data centers due to its affordability [50]. In addition, this selection allows model performance comparison with many existing hard drive prognostic models.

Additionally, the timeframe for analysis is limited to the three quarters: Q1, Q2, and Q3 2023, and locate the records of 18802 drives. By the end of Q3 2023, 18331 drives were functional. Thus, 98% of these functional drives worked through three quarters, and the rest were deployed during these three quarters. Meanwhile, 471 drives have failed or been removed by the maintenance crew.

In real-world data centers, it is impractical to store lifetime data for each hard drive. As a result, the available time series length of hard drives is usually variable. Therefore, a cropping strategy may be used to ensure time series length uniformity without losing failure-related information.

Figure 6:
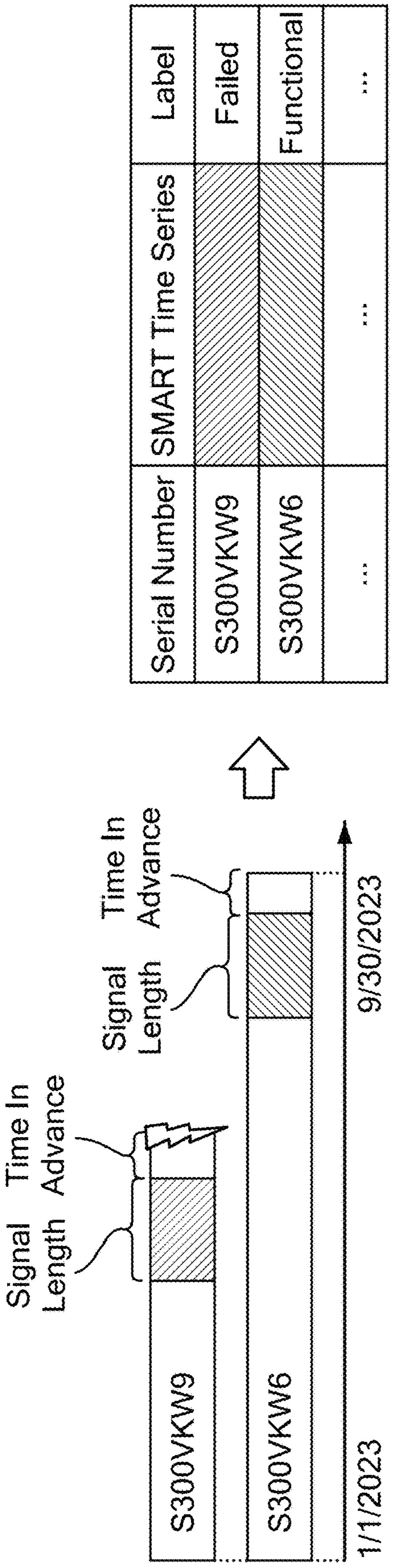
FIG. 6 illustrates SMART time series slicing and labeling process, including signal length and time-in-advance, in accordance with some embodiments.
Figure 7A:
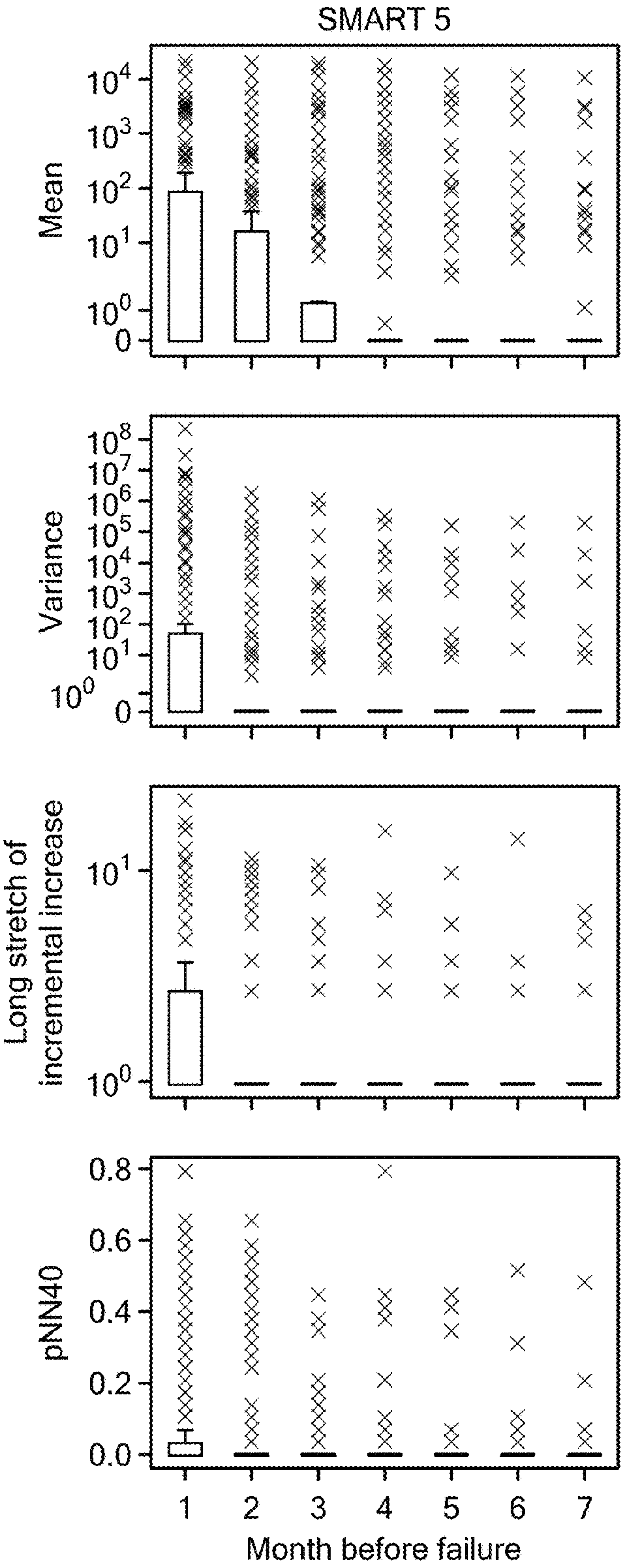
FIGS. 7A-7E illustrates trend visualization of selected SMART attribute-feature pairs and the values leading up to the failure point, thus indicating drive performance degradation, in accordance with some embodiments.
Figure 7B:
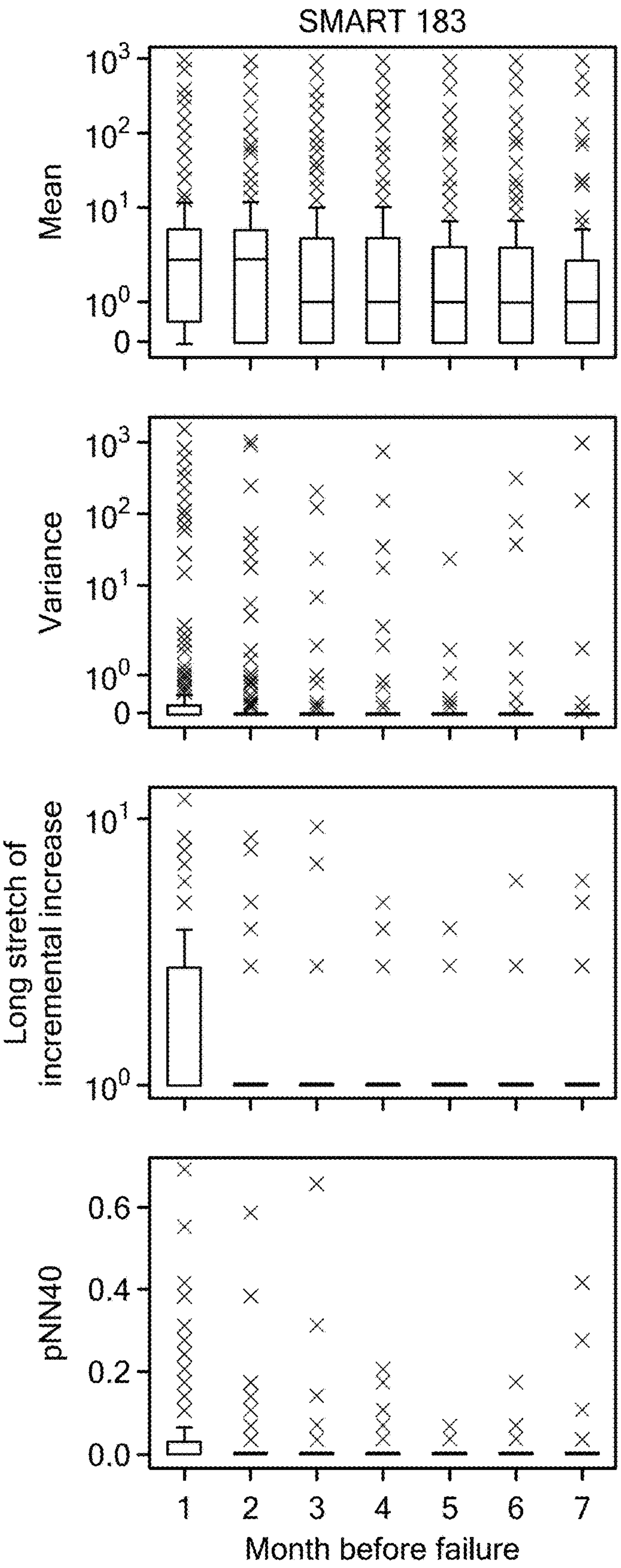
Figure 7C:
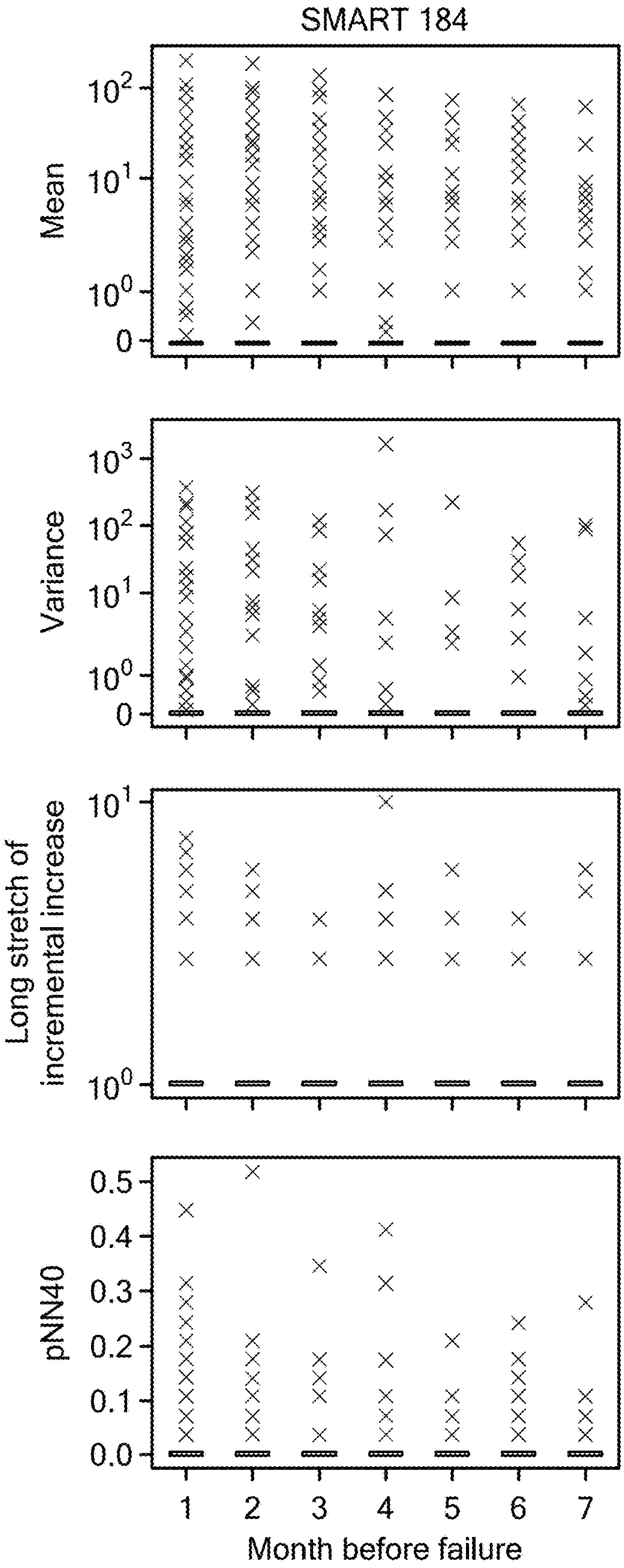
Figure 7D:
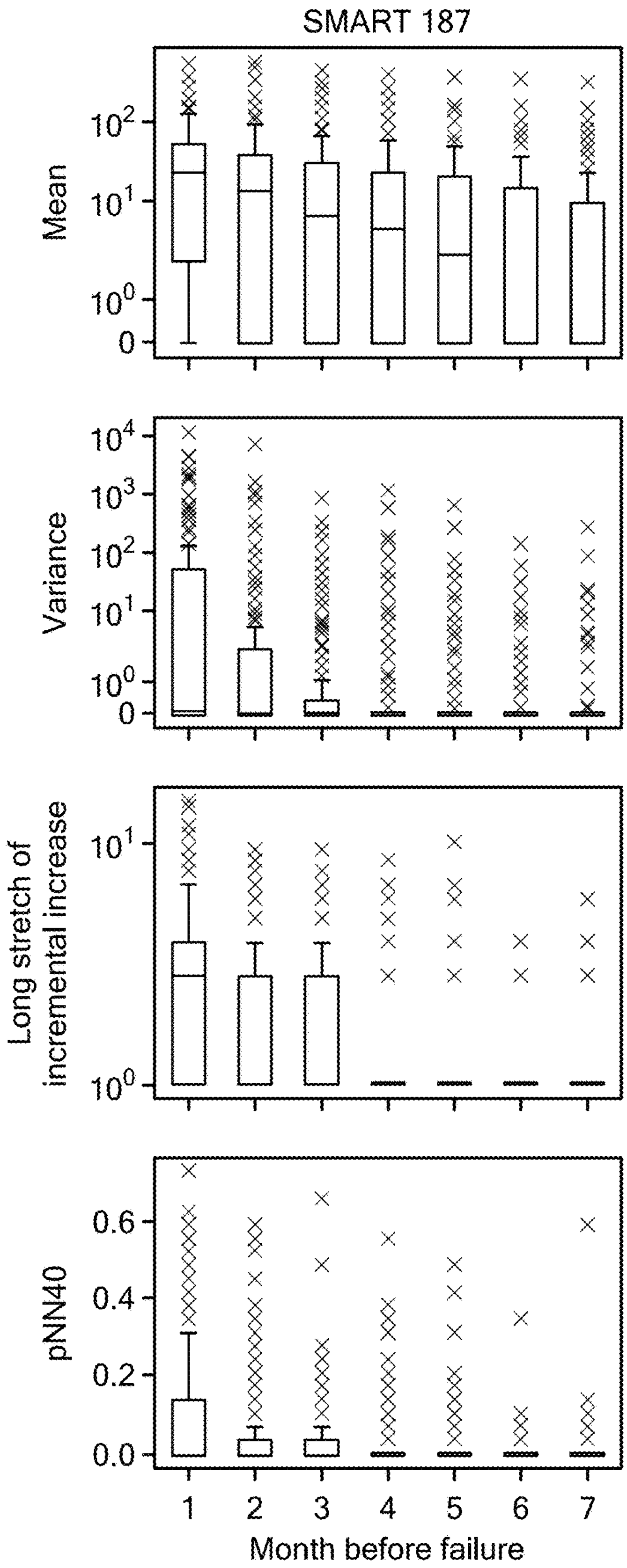
Figure 7E:
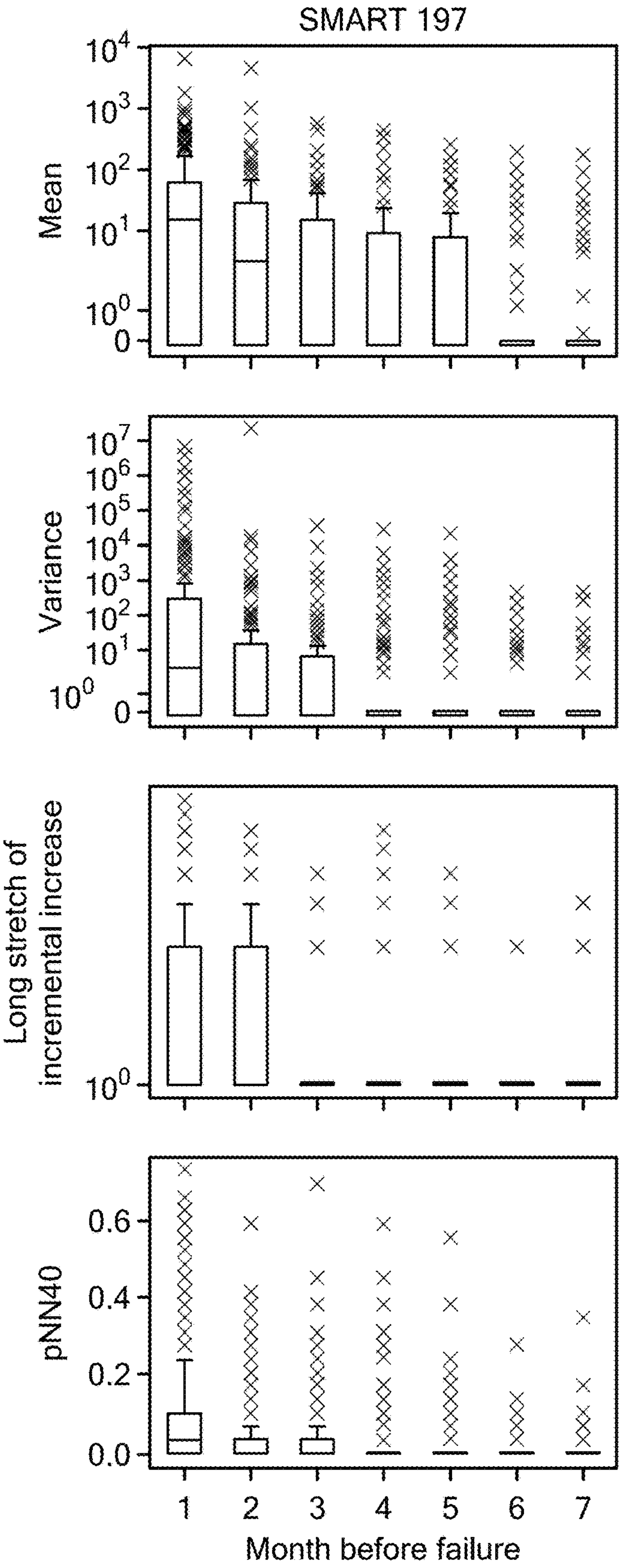

FIG. 6 shows an example of the time series slicing and labeling strategy. This process has two key variables: signal length and time-in-advance. Signal length indicates the number of days of records to slice from each drive record that will be included in the analysis. Longer time series contain more information but require more storage and process capacity, and shorter time series may compromise the model performance because of information loss. The time-in-advance indicates how early the model can accurately predict future failure. Longer lead time offers more time to prepare for the anticipated failure, such as giving the maintenance crew more schedule flexibility. However, as the greater the lead time, there is more potential for false alarms, and thus the false alarm rate will rise when lead time increases.

Sensitivity analysis is performed on signal length and time-in-advance to analyze the impact of time series slicing strategy on the prediction performance. Another goal is to identify a range of variable values that optimize predictive performance and model robustness. This analysis ties back to the goal of making clear and explainable policy decisions.

The chosen Seagate drive model has 23 SMART attributes in both raw and normalized time series format. Only attributes in raw format are considered to avoid information loss from the manufacturer-specified normalization calculation. Therefore, each labeled hard drive record contains 23 even-length time series. Then 24 features are extracted from each SMART time series, including mean, variance, and catch22 highly comparative features [51].

TABLE 1

Selected SMART attributes with degradation signatures

| Index | Name | Description |
| --- | --- | --- |
| SMART 5 | Reallocated sector count | Number of bad sectors that have been found and remapped. |
| SMART 183 | Runtime bad block | Number of data blocks with uncorrectable errors encountered during operation. |
| SMART 184 | End-to-end error | Number of parity errors after transferring through the drive's cache RAM. |
| SMART 187 | Reported uncorrectable error | Number of errors that are unrecoverable using hardware error correction code. |
| SMART 197 | Current pending sector count | Number of sectors waiting to be remapped due to unrecoverable read errors. |

TABLE 2

Selected time series features

| Feature Name | Description | Characteristics |
| --- | --- | --- |
| Mean | Average value of the given time series | Central tendency |
| Variance | Expectation of the squared deviation of time series from the mean | Dispersion |
| Long stretch of incremental increase | Longest period of successive incremental increases | Consecutive stretch |
| pNN40 | Proportion of successive differences exceeding 0.04 standard deviation | Incremental difference |

A total of 20 SMART attribute-feature pairs were chosen as degradation indicators because they show a clear trend as hard drive performance degrades over time. FIGS. 7A-7E show the selected SMART attribute-feature pairs and their values leading up to the failure point. In most pairs, the average values of features increase as the months approach the failure point, especially for feature pairs involving SMART 5 and SMART 187. The variance of some paired value increases as well, such as SMART 5-Mean and SMART197-Variance, while others maintain stable. For all pairs, the number of outliers increases, and their magnitudes also increase as the failure approaches. These trends and their interactions extract the predictive information in the raw SMART time series, and the selected time series feature pairs will serve as input for XGBoost modeling.

Table 1 summarizes the description of the selected SMART attributes, and Table 2 summarizes the time series features that are extracted from each SMART attribute. Most selected SMART attributes are error indicators that naturally increase toward the end of drive life. Therefore, time-domain features are selected that reflect the magnitude and persistence of increase. In an instance, the long stretch of incremental decrease was modified from the original catch22 to measure the incremental increase. The mean and variance are computed from the raw time series, and the long stretch of incremental increase and pNN40 [51] are computed from the z-score standardized time series.

The performance of the hard drive failure prediction system is evaluated based on the model performance using failure detection rate (FDR) and false alarm rate (FAR), and interpret the feature importance and individual prediction using user-friendly visualizations.

The core metrics used to evaluate model performance are failure detection rate (FDR) and false alarm rate (FAR). FDR, which is equivalent to recall or sensitivity in classic classification metrics, measures the proportion of positive records (failed drives) that are correctly identified. FAR is the inverse of specificity, and it measures the proportion of negative records that are incorrectly classified as positive. The objective of the modeling is to improve the FDR while minimizing the FAR.

The process of slicing SMART time series data requires consideration of two key variables: signal length and time-in-advance. Many factors weigh in when deciding on the values of these two variables, such as information richness, storage requirement, processing capacity, predictive accuracy, and maintenance flexibility. To gauge the impact of these two variables on predictive performance, a sensitivity analysis may be conducted on exhaustive combinations of these variables within a practical range. The feature extraction calls for time series as input, so the range for signal length begins at 2 and concludes with 50 days. The range for time-in-advance spans from 0 to 35 days. This indicates that the model may issue an alarm up to a month in advance, which is considered a reasonable upper limit. For each combination, XGBoost models were optimized for 1000 trials in a space of various model parameters like tree depth, booster type, regularization weights, learning rate, minimum loss reduction, and tree growth policies. This optimization process was executed for 1764 combinations, resulting in a total of 1,764,000 independent trials.

Figure 8:
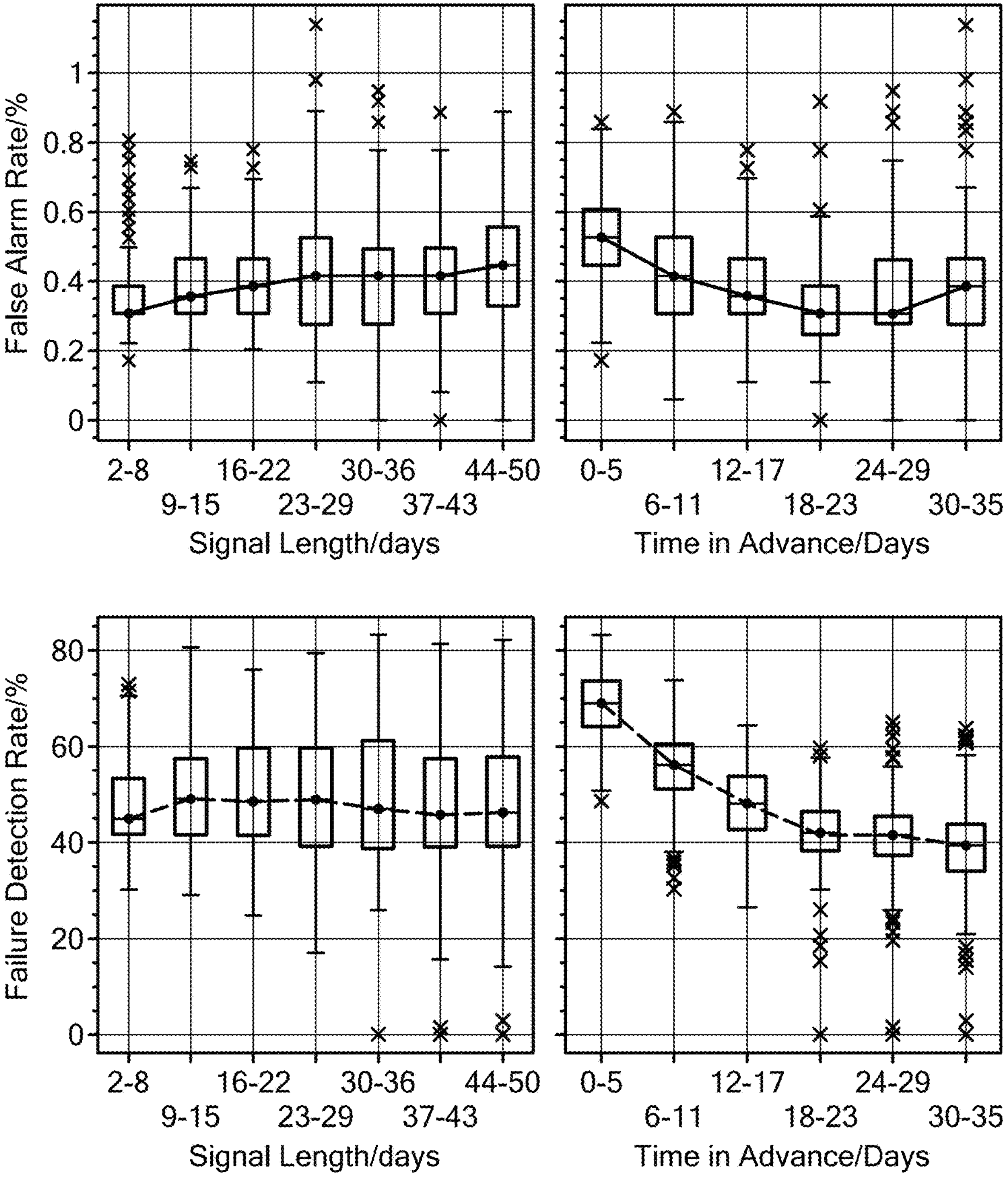
FIG. 8 illustrates the aggregated model performance across different signal lengths and time-in-advance, and the impact on the model performance for failure detection rate and false alarm rate, in accordance with some embodiments.

FIG. 8 shows the aggregated model performance across different signal lengths and the time-in-advance. The results indicate a high variability in the failure detection rate as the signal length changes, revealing that increasing the signal length does not necessarily guarantee an improved failure detection rate. On the other hand, the effect of the time-in-advance on performance is relatively consistent. The failure detection rate decreases as predictions are made further in advance. While the failure detection rate fluctuates between 0 to 80%, the false alarm rate only fluctuates between 0 to 1.2%. This suggests that the slight decrease in the false alarm rate when predicting further in advance may be a result from a smaller number of drives being classified as failures in general. Based on these findings, the balance appears to be a signal length of 9 days or more, and a time-in-advance range of 5-12 days.

FIGS. 9A and 9B show the joint impact of the signal length and time-in-advance on model performance. FIG. 9A highlights diagonal ridges that display two distinct model performance patterns. Continuous and uniform-colored ridges indicate consistent model performance regardless of proportional changes in either signal length or time-in-advance. Conversely, dotted-lined ridges suggest the model is brittle and sensitive to these changes. The ridge formation is due to the time series cropping process, where the total time series segment length remains constant on each ridge, which is the sum of signal length and time-in-advance. In other words, records on the same ridge are from the identical segment length cropped from the available time series. The ridge displays robust performance when the time series segment fully captures important predictive information, but brittle performance occurs when only partial information or too much information is extracted.

FIG. 9B shows the contour of the performance metrics. As time-in-advance increases, the contour is amplified towards the stable ridge direction. The contour map confirms the observations from the boxplots. One ridge that demonstrates good and steady performance connects (2, 35) and (37, 0). Thus, based on practicality and insights from the boxplot, signal length of 32 days and time-in-advance of 5 days is selected to process data for final model training.

The XGBoost model is re-fit on the training set, and Table 3 presents the classification performance on the test set, which contains Backblaze hard drive data from 2023 Q3. The proposed model achieves 74.7% failure detection rate and a false alarm rate of 0.73%. The model outperforms the interpretable optimal survival tree in both metrics. This demonstrates that the crafted and selected features from the raw SMART time series data effectively represent the predictive power of the model while maintaining explainability.

TABLE 3

Classification performance

| Model | Failure detection rate | False alarm rate |
|---|---|---|
| Optimal survival tree [35] | 54.68% | 11.85% |
| Proposed method | 74.7% | 0.73% |

The SHAP summary plot in FIG. 10 provides an overview of how each feature affects the likelihood of hard drive failure. Each point in the plot represents a hard drive record, with its shading indicating its feature value and its projection on the x axis reflecting the magnitude of the SHAP value. This value corresponds to the feature's marginal impact, explaining how this feature affects hard drive failure. When considering failure as the target class, a positive SHAP value increases the chances of failure while a negative value decreases it. The summary plot also ranks the features based on their mean absolute SHAP values, with the top five being the mean values of SMART 187, 197, 184, 183, and the variance of SMART 187.

Multiple studies have shown that the value of SMART 187 is a key predictor for hard drive failure [10, 11]. The data shown in the summary plot of FIG. 10, support this conclusion. An increase in both the mean and variance of SMART 187 corresponds to a rise in its SHAP value, indicating an increased risk of failure. Additionally, the mean value of SMART 187 has a positive correlation with its SHAP value. This leads to a clear separation along the x-axis, where the darker dots are mostly on the negative SHAP value side and the lighter dots are on the positive SHAP side.

The mean value of SMART 197 also displays consistently high SHAP values. However, unlike the mean of SMART 187, when its SHAP value is positive, the correlation between the feature value and its SHAP value is not distinct. The pNN40 feature, which represents the percentage of successive differences exceeding 40% of the standard deviation, can complement the predictive power of the mean of SMART 197. The results from the summary plot suggest that a higher proportion of large increases in the SMART 197 pNN40 value has a positive effect on the failure risk.

On the other hand, the impact of the raw variance of SMART 183 and the pNN40 of SMART 5 on the likelihood of failure is different from that of other features. Higher values of these features correspond to a negative SHAP value, which indicates a reduced risk of failure. This seemingly counterintuitive result in fact improves the false positive rate of the predictive model. It is important to note that the objective of this study is to predict the potential hard drive failure within a relatively short time-in-advance, compared with the average lifetime of a hard drive. An increase in these features indicates a decline in hard drive performance but does not necessarily mean that the drive will fail in the short term.

Figure 11A:
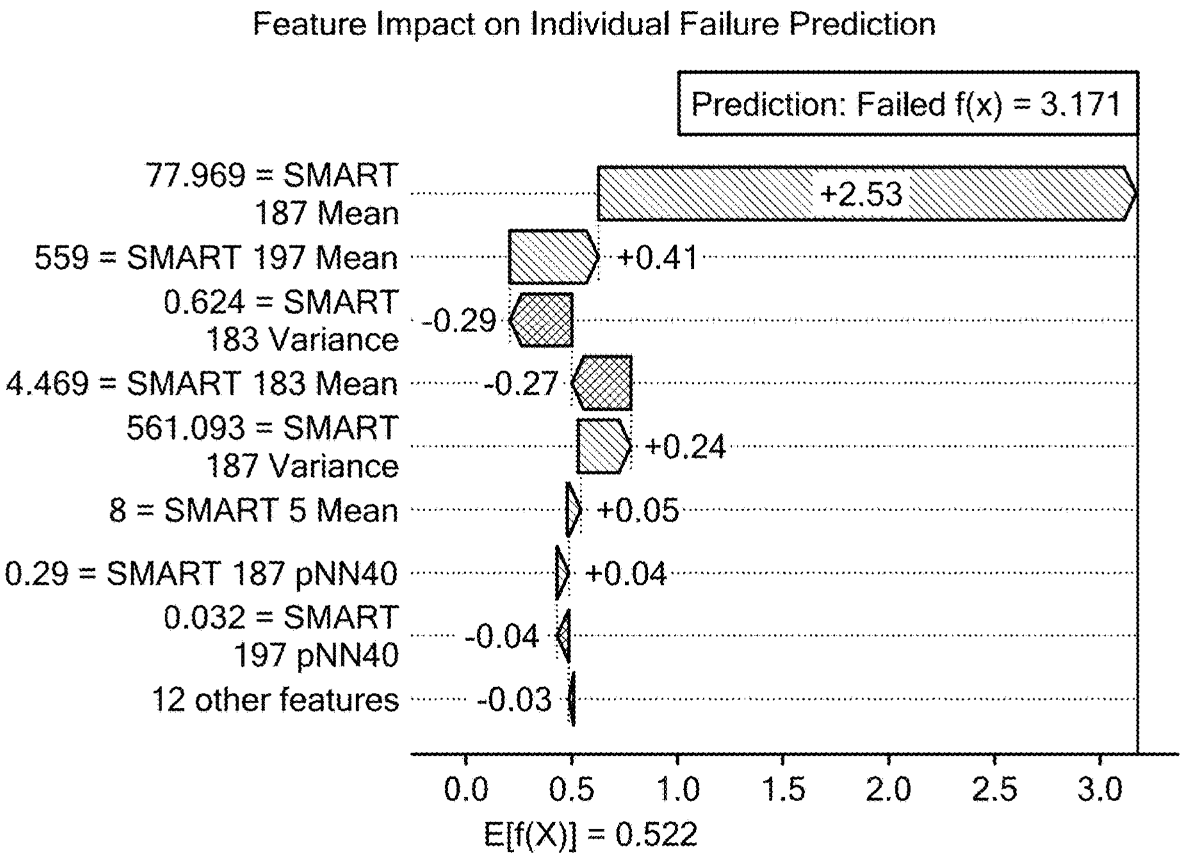
FIGS. 11A-11C illustrate example graphical interfaces that provide interpretations of the contributions to a failure prediction for a particular hard drive, in accordance with some embodiments.
Figure 11A:
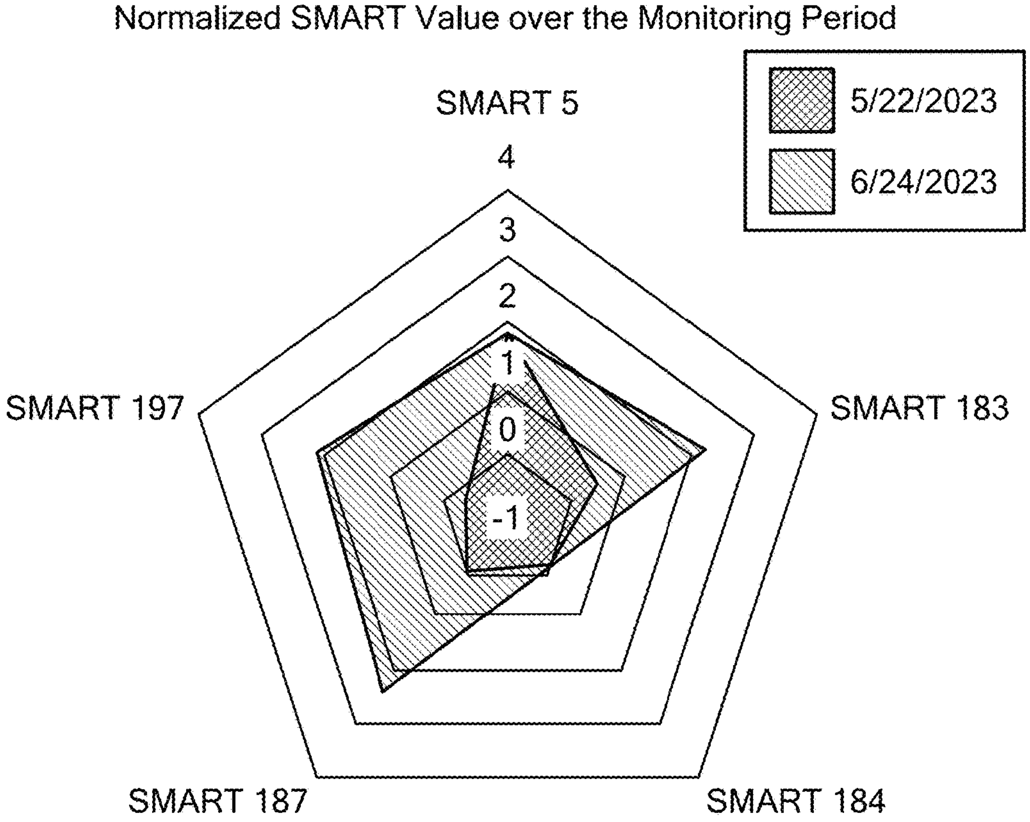
Figure 11B:
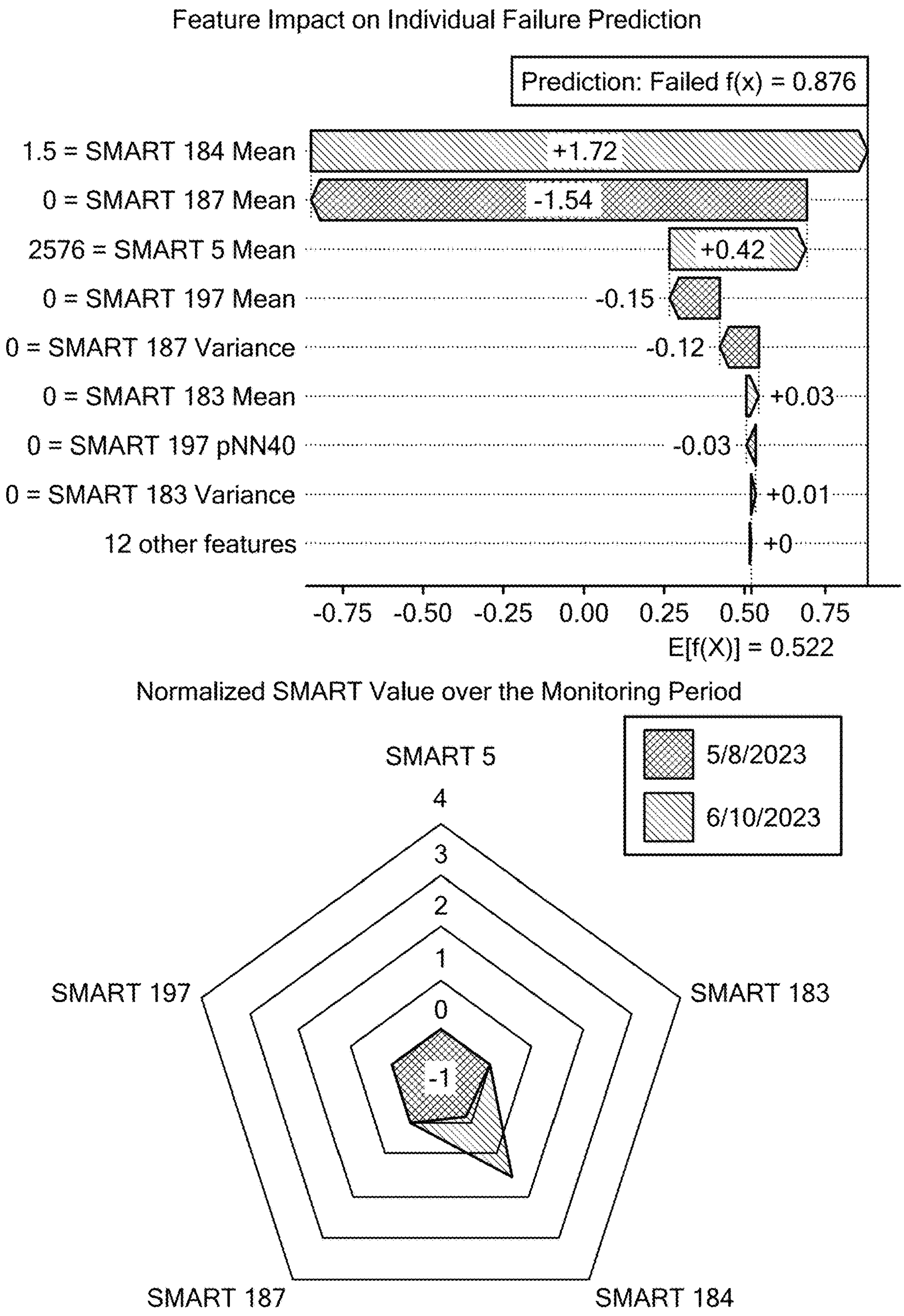
Figure 11C:
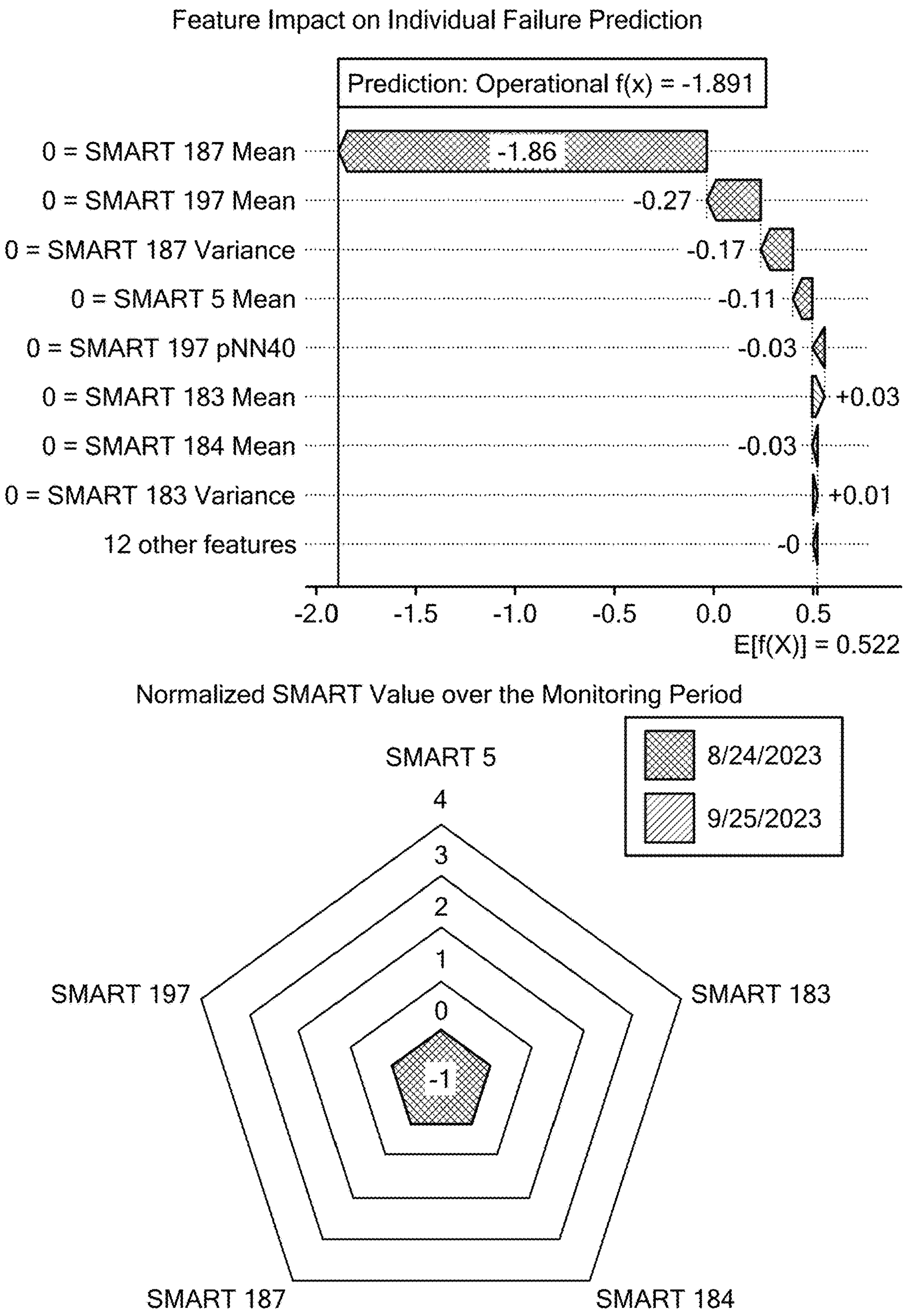

A crucial aspect of the alignment strategy is using SHAP analysis to make the model's predictions transparent and interpretable. With SHAP, each prediction may be broken into individual feature contributions and then comparisons may be performed for the model's reasoning between with ground truth and human judgment. In some embodiments, a prediction result interface with a dual-graph representation may be used, which includes a waterfall graph and a radial plot. FIGS. 11A-11C show three sets of example interfaces that facilitate the understanding of the individual prediction.

The waterfall graph shows the sequential contributions of different features towards a specific prediction. The features are analyzed from the bottom going up to see how each feature contributes additively to the likelihood of failure. The radial plot is placed adjacent to the waterfall graph and charts the normalized SMART values over a set monitoring interval. The radial axis corresponds to a distinct SMART attribute, and displays the temporal evolution of these attributes. The silhouette surrounding the plot represents the evolution of SMART attributes over the monitoring period, where the time series from this period serves as model input.

For the hard drive identified by the serial number S300WQBL, the waterfall graph from FIG. 11A reveals that SMART 187 Mean plays a significant role in steering the predicted outcome towards failure. The adjacent radial plot demonstrates the progression of SMART 187 scaling towards the outer boundaries over the monitoring period. Compared with SMART 187, other attributes had a less dominant impact on the failure prediction. Therefore, the failure of this drive is due to the accumulation of uncorrectable sectors after hard drive self-correction.

For the hard drive identified by the serial number S301KMSG, the key failure indicator is the mean value of SMART 184, as shown in FIG. 11B. Compared to the hard drive S300WQBL, the SMART 187 of this hard drive shows no progression throughout the monitoring period and steers the prediction toward an operational state. The failure of this drive is due to the parity error in the drive's cache random access memory (RAM) and the high number of bad sectors that were remapped before the monitoring period also contributes to the failure risk.

The hard drive S300WDVC is a typical operational drive with no SMART attribute change over the monitoring period. In the waterfall graph shown in FIG. 11C, all the SMART features steer the prediction toward the operational state except for SMART 183. This is expected as SMART 183 keeps track of the number of data blocks that have encountered uncorrectable errors during operation, before self-correction. A fixed number for SMART 183 is also associated with a nonoperational drive with no runtime.

In conclusion, the methods and techniques described herein for predicting hard drive failure through the extraction of explainable features from SMART time series data shows promising results. The SHAP feature importance analysis revealed that the mean values of SMART 187 and 197, as well as the pNN40 value of SMART 197, had a positive impact on the likelihood of failure. On the other hand, a higher value of the raw variance of SMART 183, pNN40, and the long stretch of incremental difference of SMART 5 corresponded to a reduced risk of failure in the short term. The re-fit XGBoost model achieved a 74.7% failure detection rate and a 0.73% false alarm rate, outperforming the interpretable optimal survival tree in both metrics.

The hard drive failure prediction system may deliver accurate, interpretable, and actionable predictions for disk health monitoring. By leveraging explainable time series features, conducting sensitivity analyses, and utilizing explainable machine learning models, the models enhance the effectiveness of disk prognostics, enabling proactive maintenance and optimization of resources in various implementation environments such as data center pod operations and NAS pods. Additionally, the possibility of deploying these models of the hard drive failure prediction system on edge computing devices further extends their application potential, enabling real-time monitoring and localized decision-making for enhanced disk system management.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

REFERENCES

[1] Sriram Sankar et al. "Datacenter Scale Evaluation of the Impact of Temperature on Hard Disk Drive Failures". In: *ACM Transactions on Storage* 9.2 (July 2013), pp. 1-24.

[2] James S. Plank. "The Raid-6 Liber8Tion Code". In: *International Journal of High Performance Computing Applications* 23.3 (Aug. 1, 2009), pp. 242-251.

[3] Wayback Machine. Jun. 12, 2001. url: https://web.archive.org/web/20010612122823/http://www.seagate.com/newsinfo/docs/disc/enhanced_smart.pdf (visited on 02/03/2023).

[4] Joseph F. Murray, Gordon F. Hughes, and Kenneth Kreutz-Delgado. "Machine Learning Methods for Predicting Failures in Hard Drives: A Multiple-Instance Application". In: *The Journal of Machine Learning Research* 6 (Dec. 1, 2005), pp. 783-816.

[5] G. F. Hughes et al. "Improved disk-drive failure warnings". In: *IEEE Transactions on Reliability* 51.3 (September 2002). Conference Name: IEEE Transactions on Reliability, pp. 350-357.

[6] J. Murray, G. Hughes, and K. Kreutz-Delgado. "Hard drive failure prediction using non-parametric statistical methods". In: 2003.

[7] Jing Shen et al. "Random-forest-based failure prediction for hard disk drives". In: *International Journal of Distributed Sensor Networks* 14.11 (November 2018), p. 155014771880648.

[8] Preethi Anantharaman, Mu Qiao, and Divyesh Jadav. "Large Scale Predictive Analytics for Hard Disk Remaining Useful Life Estimation". In: 2018 *IEEE International Congress on Big Data* (*BigData Congress*). 2018 IEEE International Congress on Big Data (BigData Congress). July 2018, pp. 251-254.

[9] Yang Hu et al. "Prognostics and health management: A review from the perspectives of design, development and decision". In: *Reliability Engineering & System Safety* 217 (Jan. 1, 2022), p. 108063.

[10] Chang Xu et al. "Health Status Assessment and Failure Prediction for Hard Drives with Recurrent Neural Networks". In: *IEEE Transactions on Computers* 65.11 (November 2016). Conference Name: IEEE Transactions on Computers, pp. 3502-3508.

[11] Shuai Pang et al. "A combined Bayesian network method for predicting drive failure times from SMART attributes". In: 2016 *International Joint Conference on Neural Networks* (*IJCNN*). 2016 International Joint Conference on Neural Networks (IJCNN). ISSN: 2161-4407. July 2016, pp. 4850-4856.

[12] Kamaljit Kaur and Kuljit Kaur. "Failure Prediction and Health Status Assessment of Storage Systems with Decision Trees". In: *Advanced Informatics for Computing Research*. Ed. by Ashish Kumar Luhach et al. Communications in Computer and Information Science. *Singapore: Springer,* 2019, pp. 366-376.

[13] Iago C. Chaves et al. "BaNHFaP: A Bayesian Network Based Failure Prediction Approach for Hard Disk Drives". In: 2016 *5th Brazilian Conference on Intelligent Systems* (*BRACIS*). 2016 5th Brazilian Conference on Intelligent Systems (BRACIS). October 2016, pp. 427-432.

[14] Fernando Dione S. Lima et al. "Remaining Useful Life Estimation of Hard Disk Drives based on Deep Neural Networks". In: 2018 *International Joint Conference on Neural Networks* (*IJCNN*). 2018 International Joint Conference on Neural Networks (IJCNN). ISSN: 2161-4407. July 2018, pp. 1-7.

[15] Jiang Xiao et al. "Disk Failure Prediction in Data Centers via Online Learning". In: *Proceedings of the 47th International Conference on Parallel Processing*. ICPP '18. New York, NY, USA: Association for Computing Machinery, Aug. 13, 2018, pp. 1-10.

[16] Shujie Han et al. "StreamDFP: A General Stream Mining Framework for Adaptive Disk Failure Prediction". In: *IEEE Transactions on Computers* 72.2 (February 2023). Conference Name: IEEE Transactions on Computers, pp. 520-534.

[17] Sandipan Ganguly et al. "A Practical Approach to Hard Disk Failure Prediction in Cloud Platforms: Big Data Model for Failure Management in Datacenters". In: 2016 *IEEE Second International Conference on Big Data Computing Service and Applications* (*BigDataService*). 2016 IEEE Second International Conference on Big Data Computing Service and Applications (BigDataService). March 2016, pp. 105-116.

[18] Yong Xu et al. "Improving Service Availability of Cloud Systems by Predicting Disk Error". In: USENIX Annual Technical Conference. Apr. 23, 2018.

[19] Backblaze Hard Drive Stats. url: https://www.backblaze.com/b2/hard-drive-test-data.html (visited on 12/05/2022).

[20] Ao Ma et al. "RAIDShield: Characterizing, Monitoring, and Proactively Protecting Against Disk Failures". In: *ACM Transactions on Storage* 11.4 (Nov. 20, 2015), 17:1-17:28.

[21] Bingpeng Zhu et al. "Proactive drive failure prediction for large scale storage systems". In: 2013 *IEEE* 29*th Symposium on Mass Storage Systems and Technologies* (*MSST*). 2013 IEEE 29th Symposium on Mass Storage Systems and Technologies (MSST). ISSN: 2160-1968. May 2013, pp. 1-5.

[22] Wenjun Yang et al. "Hard Drive Failure Prediction Using Big Data". In: 2015 *IEEE* 34*th Symposium on Reliable Distributed Systems Workshop* (*SRDSW*). 2015 IEEE 34th Symposium on Reliable Distributed Systems Workshop (SRDSW). September 2015, pp. 13-18.

[23] Ji Zhang et al. "Minority Disk Failure Prediction Based on Transfer Learning in Large Data Centers of Heterogeneous Disk Systems". In: *IEEE Transactions on Parallel and Distributed Systems* 31.9 (September 2020). Conference Name: IEEE Transactions on Parallel and Distributed Systems, pp. 2155-2169.

[24] Song Huang et al. "Characterizing Disk Failures with Quantified Disk Degradation Signatures: An Early Experience". In: 2015 *IEEE International Symposium on Workload Characterization*. 2015 IEEE International Symposium on Workload Characterization. October 2015, pp. 150-159.

[25] Sagar Kamarthi, Abe Zeid, and Yogesh Bagul. "Assessment of current health of hard disk drives". In: 2009 *IEEE International Conference on Automation Science and Engineering*. 2009 IEEE International Conference on Automation Science and Engineering. ISSN: 2161-8089. August 2009, pp. 246-249.

[26] Ben Eckart et al. "Failure Prediction Models for Proactive Fault Tolerance within Storage Systems". In: 2008 *IEEE International Symposium on Modeling, Analysis and Simulation of Computers and Telecommunication Systems*. 2008 IEEE International Symposium on Modeling, Analysis and Simulation of Computers and Telecommunication Systems. ISSN: 2375-0227. September 2008, pp. 1-8.

[27] Jing Li et al. "New Metrics for Disk Failure Prediction That Go Beyond Prediction Accuracy". In: *IEEE Access* 6 (2018). Conference Name: IEEE Access, pp. 76627-76639.

[28] Yu Wang, Qiang Miao, and Michael Pecht. "Health monitoring of hard disk drive based on Mahalanobis distance". In: 2011 *Prognostics and System Health Management Conference*. 2011 Prognostics and System Health Management Conference. ISSN: 2166-5656. May 2011, pp. 1-8.

[29] Yu Wang et al. "Online Anomaly Detection for Hard Disk Drives Based on Mahalanobis Distance". In: *IEEE Transactions on Reliability* 62.1 (March 2013). Conference Name: IEEE Transactions on Reliability, pp. 136-145.

[30] Greg Hamerly and Charles Elkan. "Bayesian approaches to failure prediction for disk drives". In: *Proceedings of the Eighteenth International Conference on Machine Learning*. ICML '01. San Francisco, CA, USA: Morgan Kaufmann Publishers Inc., Jun. 28, 2001, pp. 202-209.

[31] Ying Zhao et al. "Predicting Disk Failures with HMM- and HSMM-Based Approaches". In: *Advances in Data Mining. Applications and Theoretical Aspects*. Ed. by Petra Perner. Lecture Notes in Computer Science. Berlin, Heidelberg: Springer, 2010, pp. 390-404.

[32] Jing Li et al. "Hard drive failure prediction using Decision Trees". In: *Reliability Engineering & System Safety* 164 (Aug. 1, 2017), pp. 55-65.

[33] Jing Li et al. "Hard Drive Failure Prediction Using Classification and Regression Trees". In: 2014 44*th Annual IEEE/IFIP International Conference on Dependable Systems and Networks*. 2014 44th Annual IEEE/IFIP International Conference on Dependable Systems and Networks. ISSN: 2158-3927. June 2014, pp. 383-394.

[34] Carlos A. C. Rinc' on et al. "Disk failure prediction in heterogeneous environments". In: 2017 *International Symposium on Performance Evaluation of Computer and Telecommunication Systems* (*SPECTS*). 2017 International Symposium on Performance Evaluation of Computer and Telecommunication Systems (SPECTS). July 2017, pp. 1-7.

[35] Maxime Amram et al. "Interpretable predictive maintenance for hard drives". In: *Machine Learning with Applications* 5 (Sep. 15, 2021), p. 100042.

[36] Sidi Lu et al. "Making disk failure predictions SMARTer!" In: *Proceedings of the* 18*th USENIX Conference on File and Storage Technologies*. FAST'20. USA: USENIX Association, Feb. 24, 2020, pp. 151-168.

[37] Xiaoyi Sun et al. "System-level hardware failure prediction using deep learning". In: *Proceedings of the* 56*th Annual Design Automation Conference* 2019. DAC '19. New York, NY, USA: Association for Computing Machinery, Jun. 2, 2019, pp. 1-6.

[38] Mirela Madalina Botezatu et al. "Predicting Disk Replacement towards Reliable Data Centers". In: *Proceedings of the* 22*nd ACM SIGKDD International Conference on Knowledge Discovery and Data Mining*. KDD '16: The 22nd ACM SIGKDD International Conference on Knowledge Discovery and Data Mining. San Francisco California USA: ACM, Aug. 13, 2016, pp. 39-48.

[39] Marwin Zufle et al. "To Fail or Not to Fail: Predicting Hard Disk Drive Failure Time Windows". In: *Measurement, Modelling and Evaluation of Computing Systems*. Ed. by Holger Hermanns. Lecture Notes in Computer Science. Chain: Springer International Publishing, 2020, pp. 19-36.

[40] Qi Wu et al. "Tree-Based Model with Advanced Data Preprocessing for Large Scale Hard Disk Failure Prediction". In: *Large-Scale Disk Failure Prediction*. Ed. by Cheng He et al. Communications in Computer and Information Science. Singapore: Springer, 2020, pp. 85-99.

[41] Farzaneh Mahdisoltani, Joan Stefanovici, and Bianca Schroeder. "Improving storage system reliability with proactive error prediction". In: *Proceedings of the* 2017 *USENIX Conference on Usenix Annual Technical Conference*. USENIX ATC '17. USA: USENIX Association, Jul. 12, 2017, pp. 391-402.

[42] Andy Klein. Using Machine Learning to Predict Hard Drive Failures. Backblaze Blog—Cloud Storage & Cloud Backup. Oct. 12, 2021. url: https://www.backblaze.com/blog/using-machine-learning-topredict-hard-drive-failures/(visited on 10/19/2023).

[43] Antonino Ferraro et al. "Evaluating eXplainable artificial intelligence tools for hard disk drive predictive maintenance". In: *Artificial Intelligence Review* 56.7 (Jul. 1, 2023), pp. 7279-7314.

[44] Tianqi Chen and Carlos Guestrin. "XGBoost: A Scalable Tree Boosting System". In: *Proceedings of the* 22*nd ACM SIGKDD International Conference on Knowledge*

*Discovery and Data Mining*. KDD '16. New York, NY, USA: Association for Computing Machinery, Aug. 13, 2016, pp. 785-794.
[45] Scott M. Lundberg and Su-In Lee. "A unified approach to interpreting model predictions". In: *Proceedings of the 31st International Conference on Neural Information Processing Systems*. NIPS'17. Red Hook, NY, USA: Curran Associates Inc., Dec. 4, 2017, pp. 4768-4777.
[46] Stan Lipovetsky and Michael Conklin. "Analysis of regression in game theory approach". In: *Applied Stochastic Models in Business and Industry* 17.4 (2001). eprint: https://onlinelibrary.wiley.com/doi/pdf/10.1002/asmb.446, pp. 319-330.
[47] Scott M. Lundberg, Gabriel G. Erion, and Su-In Lee. *Consistent Individualized Feature Attribution for Tree Ensembles*. Mar. 6, 2019.
[48] Scott M. Lundberg et al. "From local explanations to global understanding with explainable AI for trees". In: *Nature Machine Intelligence* 2.1 (January 2020). Number: 1 Publisher: Nature Publishing Group, pp. 56-67.
[49] Fabian Pedregosa et al. "Scikit-learn: Machine Learning in Python". In: *The Journal of Machine Learning Research* 12 (null Nov. 1, 2011), pp. 2825-2830.
[50] Andy Klein. Backblaze Drive Stats for Q3 2022. Backblaze Blog—Cloud Storage & Cloud Backup. Nov. 1, 2022. url: https://www.backblaze.com/blog/backblaze-drive-stats-for-q3-2022/ (visited on Dec. 5, 2022).
[51] Carl H. Lubba et al. "catch22: CAnonical Time-series CHaracteristics". In: *Data Mining and Knowledge Discovery* 33.6 (Nov. 1, 2019), pp. 1821-1852

What is claimed is:

1. A computer-implemented method for predicting hard drive failure in a computing system, the computing system comprising:
at least one processor;
a hard drive; and
at least one memory including instructions for executing the computer-implemented method by the at least one processor;
the computer-implemented method comprising:
receiving operational data for the hard drive;
selecting a portion of the operational data corresponding to a time period based on a predetermined signal length;
extracting, from the portion of the operational data, input data representing a set of features indicative of hard drive health;
determining, using the input data as input to a trained hard drive failure prediction neural network, hard drive health output data, wherein the trained hard drive failure prediction neural network is trained using training data from a plurality of hard drives and wherein the training data corresponds to the predetermined signal length and a predetermined time-in-advance value;
extracting, from the hard drive health output data, a hard drive failure indicator;
determining whether the hard drive failure indicator represents failure; and
in response to determining that the hard drive failure indicator represents failure, analyzing the set of features indicative of hard drive health corresponding to the hard drive to generate an explainable dataset;
generating a graphical user interface using the explainable dataset; and
displaying, on a screen of the computing system, the graphical user interface.

2. The computer-implemented method of claim 1, further comprising:
in response to determining that the hard drive failure indicator represents failure, analyzing the set of features indicative of hard drive health corresponding to the hard drive to generate an explainable dataset; and
generating a graphical user interface using the explainable dataset,
generating an alert indicating a time span, based on the predetermined time-in-advance value, until failure of the hard drive.

3. The computer-implemented method of claim 2, wherein analyzing the set of features indicative of hard drive health includes using Shapley additive explanations (SHAP) analysis.

4. The computer-implemented method of claim 1, wherein the operational data are Self-Monitoring, Analysis, and Reporting Technology (SMART) attributes and received from a SMART monitoring system.

5. The computer-implemented method of claim 4, further comprising, prior to receiving the operational data:
performing statistical analysis of the training data;
determining, based on the statistical analysis, a set of SMART attributes correlated to hard drive failure; and
storing the set of SMART attributes as the set of features indicative of hard drive health.

6. The computer-implemented method of claim 5, wherein the set of SMART attributes includes at least one of: number of bad sectors, number of data blocks with uncorrectable errors, number of parity errors, number of unrecoverable errors using hardware error correction code, and number of sectors waiting to be remapped due to unrecoverable read errors.

7. The computer-implemented method of claim 1, further comprising, prior to receiving the operational data:
determining the predetermined time-in-advance value by:
executing the trained hard drive failure prediction neural network using the training data and a time-in-advance value;
determining an accuracy value for the execution of the trained hard drive failure prediction neural network;
determining the accuracy value exceeds an accuracy threshold value; and
storing the time-in-advance value as the predetermined time-in-advance value.

8. The computer-implemented method of claim 1, wherein the trained hard drive failure prediction neural network is an extreme gradient boosting (XGBoost) model.

9. A computing system, comprising:
at least one processor;
a hard drive; and
at least one memory including instructions that, when executed by the at least one processor, cause the computing system to:
receive operational data for the hard drive;
select a portion of the operational data corresponding to a time period based on a predetermined signal length;
extract, from the portion of the operational data, input data representing a set of features indicative of hard drive health;
determine, using the input data as input to a trained hard drive failure prediction neural network, hard drive health output data, wherein the trained hard drive failure prediction neural network is trained using training data from a plurality of hard drives and wherein the training data corresponds to the predetermined signal length and a predetermined time-in-advance value;

extract, from the hard drive health output data, a hard drive failure indicator;

determine the hard drive failure indicator represents failure; and in response to determining the hard drive failure indicator represents failure, analyze the set of features indicative of hard drive health corresponding to the hard drive to generate an explainable dataset; and generate a graphical user interface using the explainable dataset.

10. The computing system of claim 9, wherein the at least one memory further comprises instructions that, when executed by the at least one processor, further cause the computing system to:

in response to determining the hard drive failure indicator represents failure, generate an alert indicating a time span, based on the predetermined time-in-advance value, until failure of the hard drive.

11. The computing system of claim 10, wherein analyzing the set of features indicative of hard drive health includes using Shapley additive explanations (SHAP) analysis.

12. The computing system of claim 9, wherein the operational data are Self-Monitoring, Analysis, and Reporting Technology (SMART) attributes and received from a SMART monitoring system.

13. The computing system of claim 12, wherein the at least one memory further comprises instructions that, when executed by the at least one processor, further cause the computing system to, prior to receiving the operational data:

perform statistical analysis of the training data;

determine, based on the statistical analysis, a set of SMART attributes correlated to hard drive failure; and store the set of SMART attributes as the set of features indicative of hard drive health.

14. The computing system of claim 13, wherein the set of SMART attributes includes at least one of: number of bad sectors, number of data blocks with uncorrectable errors, number of parity errors, number of unrecoverable errors using hardware error correction code, and number of sectors waiting to be remapped due to unrecoverable read errors.

15. The computing system of claim 9, wherein the at least one memory further comprises instructions that, when executed by the at least one processor, further cause the computing system to, prior to receiving the operational data:

determine the predetermined time-in-advance value, further including instructions to:

execute the trained hard drive failure prediction neural network using the training data and a time-in-advance value;

determine an accuracy value for the execution of the trained hard drive failure prediction neural network;

determine the accuracy value exceeds an accuracy threshold value; and store the time-in-advance value as the predetermined time-in-advance value.

16. The computing system of claim 9, wherein the trained hard drive failure prediction neural network is an extreme gradient boosting (XGBoost) model.

17. A computing system for predicting hard drive failure, the computing system comprising:

at least one processor;

at least one memory; and a pod of hard drives in a data center;

wherein the computing system is configured to:

receive, using message queuing telemetry transport (MQTT) protocol, Self-Monitoring, Analysis, and Reporting Technology (SMART) data from the pod of hard drives;

select a portion of the SMART data corresponding to a time period based on a predetermined signal length;

extract, from the portion of the SMART data, input data representing a set of SMART attributes indicative of hard drive health;

determine, using the input data as input to a trained hard drive failure prediction model, hard drive health output data, wherein the trained hard drive failure prediction model is trained using training data from a plurality of hard drives and wherein the training data corresponds to the predetermined signal length and a predetermined time-in-advance value; and generate, using the hard drive health output data, a graphical user interface with a failure indicator corresponding to each hard drive from the pod of hard drives.

18. The computing system of claim 17, wherein the SMART data is received in real-time from the pod of hard drives.

19. The computing system of claim 17, wherein the graphical user interface further includes a visualization of SMART attributes corresponding to the failure indicator of each hard drive from the pod of hard drives.

20. The computing system of claim 17, wherein the set of SMART attributes indicative of hard drive health include at least one of: number of bad sectors, number of data blocks with uncorrectable errors, number of parity errors, number of unrecoverable errors using hardware error correction code, and number of sectors waiting to be remapped due to unrecoverable read errors.

21. The computer-implemented method of claim 1, further comprising:

training a hard drive failure prediction neural network using training data from a plurality of hard drives, the training data comprising the predetermined signal length of historical operational hard drive attributes and the predetermined time-in-advance value; and storing the hard drive failure prediction neural network as the trained hard drive failure prediction neural network.

* * * * *